United States Patent [19]

Simokat

[11] 4,431,875
[45] Feb. 14, 1984

[54] SIGNALLING AND CHANNEL LOOP TEST CIRCUITS FOR STATION CARRIER TELEPHONE SYSTEM

[75] Inventor: Frank L. Simokat, Babylon, N.Y.

[73] Assignee: TII Corporation, Lindenhurst, N.Y.

[21] Appl. No.: 158,874

[22] Filed: Jun. 12, 1980

Related U.S. Application Data

[62] Division of Ser. No. 932,704, Aug. 11, 1978, Pat. No. 4,230,910.

[51] Int. Cl.³ .............................................. H04B 3/46
[52] U.S. Cl. ........................................... 179/175.3 R
[58] Field of Search ................. 179/175.3 R, 175.2 R, 179/175.2 C, 2.51; 370/71, 15

[56] References Cited

U.S. PATENT DOCUMENTS

| | | | |
|---|---|---|---|
| 4,045,624 | 8/1977 | Browne | 179/175.3 R |
| 4,081,609 | 3/1978 | Beene et al. | 370/71 |
| 4,170,722 | 10/1979 | Blackburn | 179/175.3 R |

*Primary Examiner*—Joseph A. Popek
*Attorney, Agent, or Firm*—LeBlanc, Nolan, Shur & Nies

[57] ABSTRACT

A plural channel amplitude modulated station carrier telephone system having a special synchronous ring detector circuit located in a station or terminal at the subscriber's end of the transmission line for signaling an incoming call for the subscriber's telephone and a special channel loop test circuit also located in the station mentioned above and employing one of the signals used in the synchronous ring detecting operation to turn on a subscriber's transmitter circuit for effecting a channel loop test.

4 Claims, 16 Drawing Figures

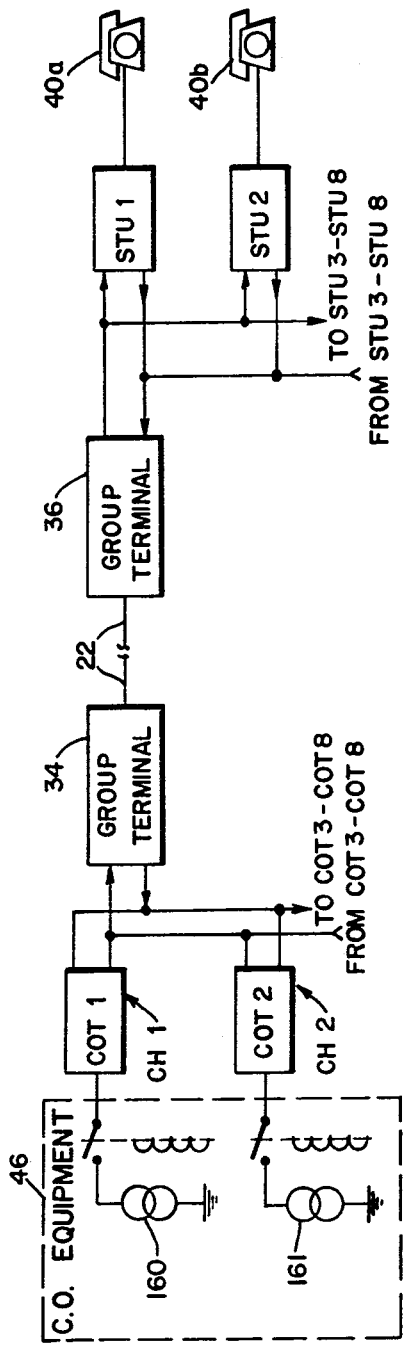
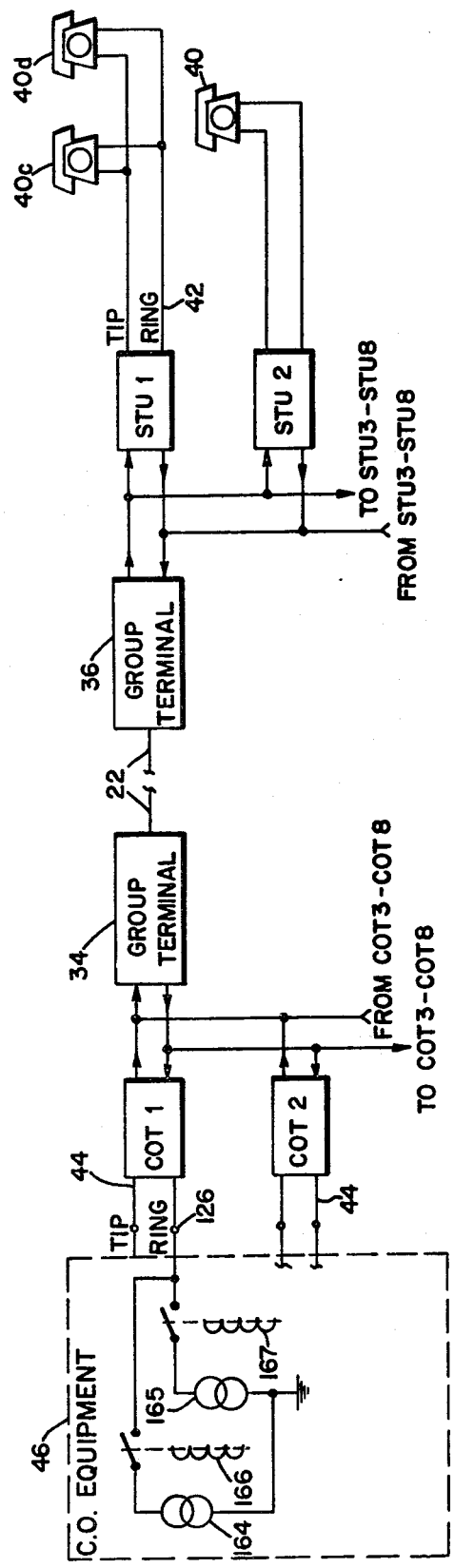
FIG. 9
FIG. 10

SIGNALLING AND CHANNEL LOOP TEST CIRCUITS FOR STATION CARRIER TELEPHONE SYSTEM

This is a division of application Ser. No. 932,704, now U.S. Pat. No. 4,230,910 filed Aug. 11, 1978.

FIELD OF INVENTION

This invention relates to plural channel amplitude modulated station carrier telephone systems (also called subscriber carrier systems) and is particularly concerned with signalling circuits and channel loop testing circuits for such systems.

BACKGROUND

As is well known, a plural channel station carrier system provides for the simultaneous transmission of several conversations over the same transmission line between a central office and a plurality of remotely located subscriber telephone stations. Typically, the carrier equipment includes a central office transmitting and receiving channel terminal unit or circuit and a subscriber transmitting and receiving channel terminal unit or circuit for each of the several subscribers served by the carrier system. The central office channel terminal circuits are located at the telephone company's central office, and the subscriber channel terminal circuits are located remotely from the central office and are connected to the central office terminal circuits by the common transmission line. The subscriber channel terminal circuits form a part of what may collectively be referred to as the subscriber terminal equipment at the end of the transmission line remote from the central office.

To signal incoming calls for the subscribers served by the carrier system it is a common cost-saving practice to use just one ringing signal generator in the subscriber terminal equipment to serve all of the subscribers rather than using a separate local ringing generator for each subscriber.

When a call comes into the central office for one of the subscribers served by the carrier system, the central office-transmitted carrier signal assigned to the called subscriber will be modulated by an a.c. alerting signal. The local ringing signal generator at the subscribers' end of the transmission line responds to this modulation by applying an a.c. ringing signal voltage of relative low, fixed frequency (typically 20 Hz) to the called subscriber's telephone to operate the called subscriber's ringer.

The frequency of the carrier-modulating alerting signal mentioned above is typically selected to be much higher than the low ringing signal frequency that is customarily used for operating the telephone ringers. For example the frequency of the carrier-modulating alerting signal may be 750 Hz. The higher modulating signal frequency provides greater noise immunity and requires less expensive filters for separating the modulating signal from the other components of carrier signal detection in the carrier signal receiver equipment at the subscribers' end of the transmission line.

The foregoing type of station carrier system is sometimes installed in place of a party line (also referred to as a multiparty line) to furnish the party line subscribers with individual or single party service. The practice of equipping the carrier system with a single ringing generator to supply the same ringing signal for operating the ringers of all of the subscribers, however, leads to a problem where the party line to be converted uses a bridged frequency ringing system.

Bridged frequency ringing is a frequency selective ringing or signalling system wherein a different central office ringing signal frequency is assigned to each subscriber on the multiparty line and wherein the telephone ringer for each subscriber is tuned (usually capacitively) to the assigned ringing signal frequency so that it responds only to the assigned ringing signal frequency. In converting this type of system to a carrier operation, it has been common practice to use the same ringing generator for all of the subscribers and to replace the tuned ringers with ones capable of operation by the same ringing frequency. Replacement of the tuned ringers is nevertheless an added cost and requires a service man's visit to the home of each subscriber.

Another extra cost dealing with signalling arises where it is desired to use one of the carrier system's channels as a party line with bridged frequency ringing. To provide such a service one prior practice has involved the use of separate ringing signal generators which are located at the central office for supplying the different low ringing frequencies (e.g., 20 Hz, 30 Hz, 40 Hz) to which the subscribers' party line telephone ringers are tuned. In response to an incoming call for one of the party line subscribers the ringing signal frequency assigned to the called subscriber is applied to amplitude modulate a higher frequency tone (typically 900 Hz), and the modulated tone is then applied to amplitude modulate the carrier that is assigned to the party line channel.

At the subscriber terminal equipment this modulated carrier is received and demodulated to recover the modulated 900 Hz tone. The 900 Hz tone is then demodulated to recover the modulating ringing frequency information for operating the called subscriber's tuned ringer. Such a signalling system is shown in FIGS. 5 and 6 of U.S. Pat. No. 3,904,833 which issued on Sept. 9, 1975.

The cost of the signalling system shown in U.S. Pat. No. 3,904,833 is increased by the additional circuits needed for first modulating the 900 Hz tone at the central office terminal and then demodulating and filtering the modulated 900 Hz tone at the subscriber terminal to recover the desired ringing frequency information.

Instead of modulating the 900 Hz tone with the low frequency central office ringing signal (e.g., 20 Hz), some carrier systems are equipped to individually modulate the carrier signal with the low frequency central office ringing signal and the 900 Hz tone to thereby mix the low frequency ringing signal with the 900 Hz tone at the central office. Upon demodulation of the modulated carrier at the subscriber terminal equipment the low frequency ringing signal and the 900 Hz tone are recovered. The recovered 900 Hz tone is then used as switching signal to apply an amplification of the low frequency ringing signal to ring the called subscriber's telephone. This signalling system also requires additional circuits at extra expense to provide bridged frequency ringing for a party line on one of the carrier system's channels.

The present invention reduces the extra costs attendant with bridged frequency ringing as well as offering additional advantages as will become apparent from the following summary and detailed description.

SUMMARY AND OBJECTS OF INVENTION

As compared with prior station carrier equipment, the station carrier system of this invention may be installed in place of a multiparty line having bridge frequency ringing to provide individual or single party service for the party line subscribers without replacing the subscribers' tuned telephone ringers. Additionally, the present invention provides for the transmission of bridged frequency ringing information without using the central office ringing signal to amplitude modulate a carrier signal or a lower frequency alerting signal (e.g., 900 Hz) as is required in the previously discussed prior art carrier systems.

Instead, the present invention provides a novel bridged frequency signalling arrangement whereby an alerting signal (e.g., a 900 Hz tone), rather than being amplitude modulated in the accepted sense, is periodically interrupted at whatever ringing rate or frequency the central office may supply. The interrupted alerting signal is applied to modulate the called subscriber's carrier signal which is transmitted from the central office.

At the subscriber terminal equipment the modulated carrier signal is demodulated to recover the periodically interrupted alerting signal, and the recovered alerting signal is then detected and filtered to provide a local ringing signal whose frequency is the same as that of the central office ringing signal. The local ringing signal will therefore have the appropriate frequency for operating a telephone ringer that is tuned to an assigned one of several central office ringing frequencies.

In the illustrated embodiment the interrupted alerting signal is advantageously synchronously detected to retrieve the ringing frequency information. Synchronous detection has the advantage of eliminating the need for special bandpass filtering to separate the alerting signal from the other frequency components that result from detection of the modulated carrier signal.

Synchronous detection of a ringing signal has previously been proposed as shon in U.S. Pat. No. 4,081,609 which issued on Mar. 28, 1978. The synchronous ring detection arrangement described in this patent, however, is costly because it requires the generation of a special pilot carrier signal and a separate receiver for receiving the pilot carrier signal.

Furthermore, the signalling system described in U.S. Pat. No. 4,081,609 is not effective to transmit central office ringing frequency information for bridged frequency ringing.

In the present invention, the interrupted alerting signal is synchronously detected without using a separate pilot carrier signal and, consequently, a pilot carrier signal receiver. This is accomplished by using a phase locked loop to provide the synchronization. In the illustrated embodiment the called subscriber's central office-transmitted carrier signal is modulated with a harmonic of the alerting signal in addition to the alerting signal itself. Upon receiving and demodulating the modulated carrier signal in the receiver of the called subscriber's subscriber channel terminal circuit, the alerting signal and its harmonic are recovered and are applied to the called subscriber's ring detector as well as to the above-mentioned phase locked loop which is common to all of the subscribers served by the carrier system.

The phase locked loop locks with the harmonic to supply an output which is then frequency divided to produce a synchronous signal. The synchronous signal is applied to the called subscriber's ring detector to synchronously detect the transmitted alerting signal. This results in the recovery of the desired ringing signal frequency which is used for operating the called subscriber's tuned ringer.

In the illustrated embodiment the alerting signal's harmonic is also used with advantage in a channel loop test to check the continuity of the carrier and audio signal paths and audio signal receive level for any selected transmission channel in the carrier system. This is accomplished by first amplifying or otherwise adjusting the level of the harmonic signal at the central office, by then injecting the level-adjusted signal into the transmitter of a selected central office channel terminal circuit to modulate the carrier signal that is transmitted from the selected central office channel terminal circuit, by receiving and detecting the thusly modulated carrier signal in the companion subscriber terminal circuit to recover the level-adjusted harmonic signal, by using the output of the previously mentioned phase locked loop to synchronously detect the recovered level-adjusted harmonic signal in the companion subscriber channel terminal circuit, by sensing the level adjustment in the synchronously detected harmonic signal in the companion subscriber channel terminal circuit, by causing transmission of the subscriber-transmit carrier signal from the companion subscriber channel terminal circuit upon sensing the detection of the level-adjusted harmonic signal, by conducting the recovered harmonic signal through the receiver and transmitter of the companion subscriber channel terminal circuit to modulate the subscriber-transmit carrier signal, and by receiving and detecting the subscriber transmit carrier signal at the originating central office channel terminal circuit to complete the "loop-around" conduction of the harmonic signal. Test equipment, such as a level detector, at the central office is used to sense the return of the harmonic signal to the central office and to check the harmonic signal's level upon its return.

In the illustrated embodiment, each transmission channel is equipped with a novel ring circuit for supplying the local ringing signal which is used to operate the subscriber's telephone ringer on the channel. In the ring circuit of this invention the local ring signal is derived by filtering the received alerting signal which is interrupted at the central office ringing signal rate. The ring circuit is also equipped to amplify the local ring signal for supplying sufficient power to drive the telephone ringer.

In one embodiment of the ring circuit the amplification is accomplished by a special low cost transistor switching circuit having a built-in current limiting feature for protecting the switching transistors. In another embodiment of the ring circuit, a special relay switching arrangement is used for providing the local ringing signal with sufficient power to operate the telephone ringer.

With the foregoing in mind a major object of this invention resides in the provision of a novel station carrier system that can be installed in place of a party line using bridged frequency ringing without requiring the replacement of the subscriber's tuned ringers.

More particularly it is an object and purpose of this invention to provide a novel station carrier signalling system and method in which ringing frequency information is transmitted for operating tuned ringers.

Another important object of this invention is the provision of a novel ring detector system and method for station carrier equipment.

Still another important object of this invention is the provision of a novel channel loop testing system and method for station carrier equipment.

A further object of this invention is the provision of a novel ring circuit for a station carrier system.

Still another object of this invention is to provide a novel synchronous detection circuit capable of synchronously detecting the alerting signal mentioned above or other a.c. signal such as one of the carrier signals itself. According to this last object the a.c. signal to be detected is fed to a signal input of a synchronous detector, and a bandpass filter is tuned to the frequency of the a.c. signal to pass the signal to a synchronous input of the synchronous detector and thus provide for the synchronous detection of the signal at the detector's signal input. A special phase locked loop is included in the circuitry and has a controllable phase shifting circuit connected intermediate the bandpass filter and the synchronous input of the detector to provide a correction for any phase distortion or phase shift that may result in the passage of the a.c. signal through the bandpass filter.

Further objects of this invention will appear as the description proceeds in connection with the appended claims and the below-described drawings.

DESCRIPTION OF DRAWINGS

FIG. 9 is a schematic block diagram showing the application of the carrier system with tuned telephone ringers and plural central office ringing generators of different frequencies;

FIG. 10 is a schematic block diagram showing the use of one of the carrier system's channels as a party line with bridged frequency ringing;

DETAILED DESCRIPTION

Figure 1:
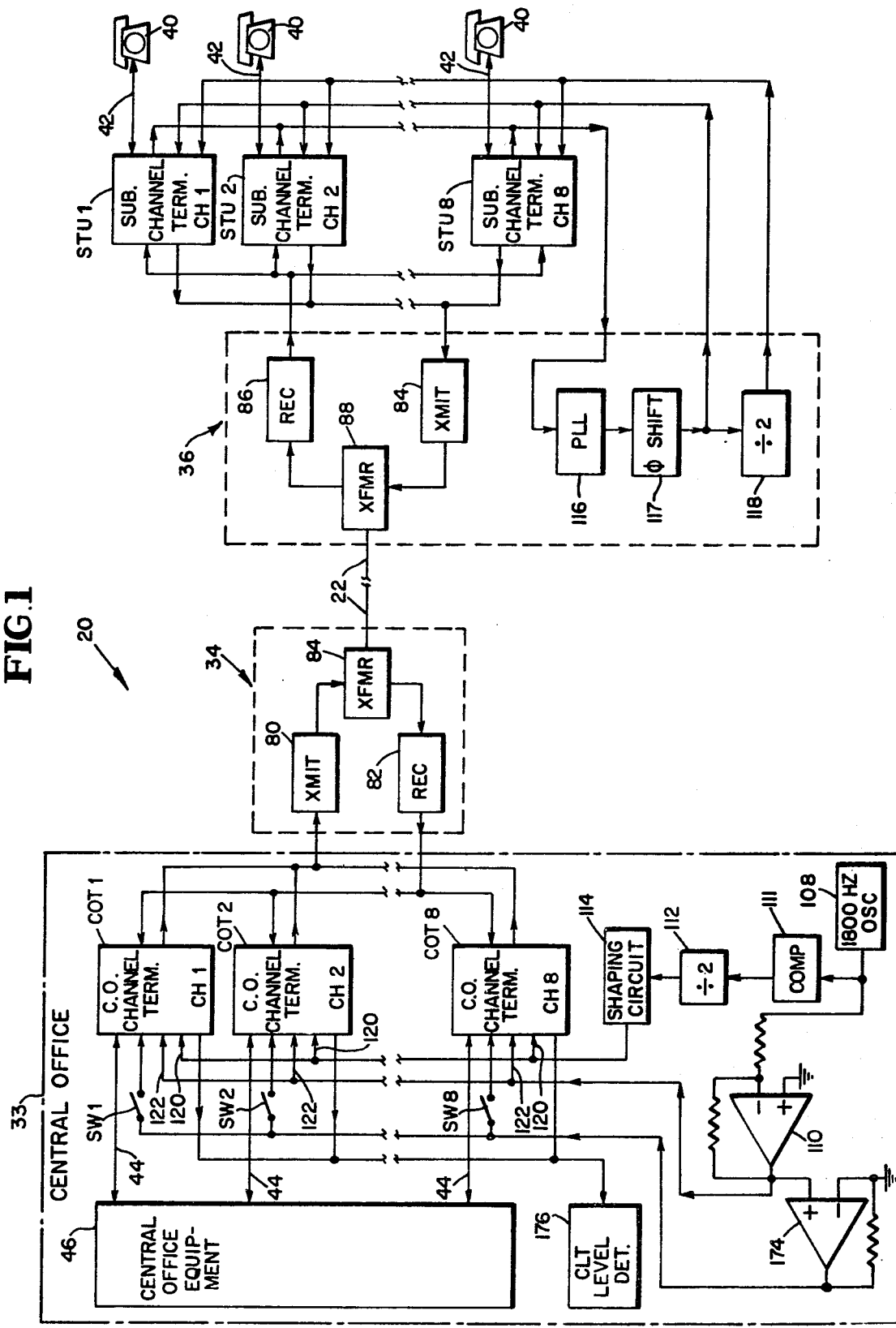
FIG. 1 is a schematic diagram of a plural channel AM station carrier incorporating the principles of this invention.

Referring to FIG. 1, one embodiment of a plural channel AM station carrier system (indicated at 20 in the drawings) incorporating the principles of this invention is shown to comprise a single two-conductor transmission line 22, a selected number of central office transmitting and receiving channel terminal circuits or units, and a corresponding number of subscriber transmitting and receiving channel circuits or units. Any suitable number of central office and subscriber channel terminal circuits may be employed depending upon the number of channels desired. For example, eight central office channel terminal circuits and eight subscriber channel terminal circuits are typically employed as shown to make up an eight-channel carrier system.

Since the central office terminal circuits are alike, only three are shown in FIG. 1 and are indicated at COT1, COT2 and COT8. For the same reason only three of the subscriber terminal circuits, namely STU1, STU2 and STU8, are shown in FIG. 1. In the following description reference to all eight central office terminal circuits is made by the designation COT1-COT8 and reference to all eight of the subscriber terminal circuits is made by the designation STU1-STU8.

As shown in FIG. 1, each of the central office terminal circuits COT1-COT8 comprises a communication transmitter (indicated at 24 in FIG. 2) for transmitting a carrier signal of pre-selected frequency and a communication receiver (indicated at 26 in FIG. 2) tuned to receive a carrier signal from only a pre-selected one of the subscriber terminal circuits. Likewise, the subscriber terminal circuits STU1-STU8 each includes a communication receiver (indicated at 28 in FIG. 3) tuned to receive a carrier signal from only a pre-selected one of the central office terminal circuits and a transmitter (indicated at 30 in FIG. 3) for transmitting a carrier signal of pre-selected frequency.

Each of the subscriber terminal circuits STU1-STU8 is paired with a different one of the central office terminal circuits COT1-COT8 to provide eight two-way transmission channels. It is understood that each of these transmission channels has two different allocated frequency bands to provide service for a subscriber, one band being for transmission in one direction from the central office terminal equipment to the subscriber terminal equipment, and the other band being for transmission in the opposite direction from the subscriber terminal equipment to the central office terminal equipment. In this example, the subscriber terminal circuits STU1-STU8 are paired with the central office terminal circuits COT1-COT8, respectively. The frequency spacing between adjacent carrier signals transmitted in either direction may be 8 kHz.

The central office terminal circuits COT1-COT8 form a part of the central office terminal equipment and are located at a central office or central office station which is generally indicated at 33 in FIG. 1. The subscriber channel terminal circuits STU1-STU8 form a part of the subscriber terminal equipment and are located remotely from central office 33 at the subscriber's end of the transmission line 22.

The transmitters and receivers in each of the terminal circuits COT1-COT8 are connected to line 22 by any suitable means such as a transformer or a central office group terminal unit or circuit 34. Group terminal circuit 34 is also located at the central office. The transmitters and receivers in each of the subscriber terminal circuits STU1–STU8 are connected to line 22 remotely from central office 33 by way of any suitable means such as a transformer or a subscriber group terminal unit or circuit 36.

The subscriber channel terminal circuits STU1–STU8 are separately connected to the telephones (indicated at 40 in FIG. 1) of eight different subscribers by suitable means such as subscriber drops 42. At the central office, the central office terminal circuits COT1–COT8 are separately connected by central office drops 44 to appropriate terminals in the central office exchange equipment which is indicated at 46 in FIG. 1.

As is customary in telephone carrier systems, each of the central office terminal circuits COT1–COT8 transmits at a pre-selected carrier frequency that is different from the transmission carrier frequencies allocated to the remaining central office channel terminal circuits and also different from the carrier frequencies that are transmitted up the transmission line 22 in the opposite direction from the subscriber channel terminal circuits STU1–STU8. Likewise, the subscriber terminal circuits STU1–STU8 transmit at pre-selected carrier frequencies that are different from each other and different from the transmit frequencies assigned to the central office terminal circuits COT1–COT8. The allocation of different carrier frequencies for the carriers on transmission line 22 is referred to and designated as frequency division multiplexing (FDM).

In a typical FDM allocation scheme the carrier frequencies transmitted from the central channel terminal circuits COT1–COT8 are all contained in an 88 kHz to 144 kHz frequency band and carrier frequencies that are transmitted from the subscriber channel terminal circuits STU1–STU8 are contained in a lower 8 kHz band.

As shown in FIG. 1, all of the central office terminal circuits COT1–COT8 and unit 34 may advantageously be grouped together in a single central office terminal. Similarly, all of the subscriber terminal circuits STU1–STU8 and unit 36 may advantageously be grouped together in a single subscriber terminal.

Still referring to FIG. 1 the central office group terminal unit 34 is a four-wire circuit providing separate transmit and receive signal paths or sections 80 and 82 which are coupled by a transformer 84 to the central office end of transmission line 22. The transmit signal path 80 feeds the central office-transmitted carrier signals from the transmitters of the central office channel terminal circuit COT1–COT8 to transmission line 22. The receiver signal path feeds the arriving subscriber transmitted carrier signals from transmission line 22 to the receivers in the central office channel terminal circuits COT1–COT8.

Similar to group terminal unit 34, unit 36 is a four-wire circuit providing separate transmit and receive signal paths or sections 84 and 86 which are coupled by a transformer 88 to the end of transmission line 22 remote from central office 33. The receiver signal path in group terminal unit 36 feeds the carrier signals arriving from the central office to the receivers in the subscriber channel terminal circuits STU1–STU8. The transmit signal path in unit 36 feeds the carrier signals from the transmitters in the subscriber channel terminal circuits STU1–STU8 to transmission line 22 for transmission up the line to the central office terminal equipment.

Group terminal units 34 and 36 may be equipped with suitable amplifying and signal level adjusting circuitry such as that described in my copending application Ser. No. 932,706 filed on even dated herewith for Amplitude Modulated Telephone Carrier System and Terminal Equipment Therefor. The central office group terminal unit 34 is additionally equipped with the usual high and low pass directional filters (not shown) to provide for the separation of the high and low groups of central office and subscriber transmit carrier frequencies from each other. The high pass filter is connected in the transmit path of unit 34 for passing the high group of central office transmitted carrier frequencies (88 kHz–144 kHz) while rejecting the low group of subscriber-transmitted carrier frequencies (8 kHz–64 kHz) to keep the low group of incoming carrier frequencies out of the transmit section 82. The low pass filter is connected in the receive path of unit 34 for passing the low group of incoming carrier frequencies while rejecting the high group of outgoing carrier frequencies to keep the latter out of receive section 84. Unit 36 is similarly equipped with high and low pass directional filters (not shown) for the same purpose.

Since the central office channel terminal circuits COT1–COT8 are alike and since the subscriber channel terminal circuits STU1–STU8 are also alike, only the channel terminal circuits for one channel (namely, channel terminal circuits COT1 and STU1) will be described in greater detail. To this end, the transmitter of the central office terminal circuit COT1 comprises a compressor 50, a low pass filter 52 and a modulator 54 all connected in series in the manner shown in FIG. 2. The receiver in the central office channel terminal circuit COT1 is equipped with a channel bandpass filter 62, a detector 64, a low pass filter 66, a fixed gain amplifier 68, an expandor 70, a hybrid 73 and an automatic gain control circuit 74. In this embodiment the AGC circuit 74 controls an attenuator 75 or other variable gain circuit in the audio portion of receiver 26 to provide AGC action for the voice frequency signals that are passed by filter 66.

The transmitter 30 and receiver 28 in the subscriber channel terminal circuit STU1 are the same as the construction thus far described for the transmitter and receiver in the central office terminal circuit COT1. To the extent that the terminal circuits STU1 and COT1 are the same, like reference numerals have been applied to designate the corresponding parts, except that the reference numerals applied to the parts of the subscriber terminal circuit STU1 have been suffixed by the letter "a" to distinguish them from the reference characters that are applied to designate the parts of the central office channel terminal circuit COT1.

Voice frequency intelligence to be transmitted by way of terminal circuits COT1 and STU1 from the central office exchange equipment 46 to the subscriber's telephone 40 is fed by drop 44 and hybrid 73 to compressor 50 in terminal circuit COT1. Compressor 40 compresses the dynamic range of the voice signals in the usual manner.

From compressor 50 the compressed voice frequency signals are fed through filter 52 to modulator 54 where they amplitude modulate a sinusoidal carrier frequency signal from an oscillator 92 to produce a double sideband amplitude modulated carrier signal. According to one carrier frequency allocation scheme, the frequency of the sinusoidal wave produced by oscillator 92 may be 88 kHz and is different from the other central office-transmitted carrier frequencies and the subscriber-transmitted carrier frequencies as previously explained.

The circuit of filter 52 may be of any suitable design for rejecting frequencies above approximately 3000 Hz.

Filter 52 therefore passes only voice frequency information up to 3000 Hz and serves to keep the carrier and other high frequencies out of compressor 50. By limiting the upper frequency of the VF modulating signal to 3 kHz due to the filtering action of filter 52, the upper and lower sidebands of the modulated carrier signal will therefore extend only to a maximum of 3 kHz from the carrier frequency.

The modulated carrier signal supplied at the output of modulator 54 is fed through the transmit section 80 of the central office group terminal unit 34 and is coupled to transmission line 22 for transmission down the line to the subscriber group terminal unit 36 along with the other carrier signals that are transmitted from the central office channel terminal circuits.

At the subscriber group terminal unit 36 the amplitude modulated carrier signal from the central office channel terminal circuit COT1 is fed along with the other central office-transmitted carriers through the receive section of terminal unit 36 to the channel bandpass filter 62a in the subscriber channel terminal circuit STU1 as well as to the corresponding channel bandpass filters in the remaining subscriber channel terminal circuits.

The channel bandpass filters in the subscriber terminal circuits STU1-STU8 are tuned to the different carrier frequencies that are allocated to their associated central office channel terminal circuits COT1-COT8. Each channel bandpass filter therefore passes with the least attenuation the incoming carrier frequency (together with its sidebands) that is allocated to its associated central office channel terminal circuit while rejecting the other carrier frequencies. Thus, for this example, the channel bandpass filter 62a in the subscriber terminal circuit STU1 will pass with the least attenuation the modulated carrier signal from the central office channel terminal circuit COT1. In a similar fashion the channel bandpass filter (not shown) in subscriber channel terminal circuit STU2 will pass the modulated carrier frequency from central office terminal circuit COT2, and so on.

Upon passing through filter 62a, the modulated carrier signal from terminal circuit COT1 is applied to and detected by detector 64a which may be of any suitable type such as an envelope or synchronous detector.

The components of detection are fed to filter 66a. Filter 66a is conventionally provided with an upper cutoff of about 3000 Hz to pass the VF components of detection while rejecting the carrier frequency component and other components higher than 3000 Hz. Filter 66a therefore separates the desired voice frequency intelligence from the other components of detection.

The recovered VF signals which are passed by filter 66a are attenuated by attenuator 75a under the control of AGC circuit 74a and are then amplified by amplifier 68a. From amplifier 68a the VF signals are a.c. coupled to expandor 70a. Up to this point in the signal path, the dynamic range of the VF signals are still in their compressed state, having been compressed by the companion compressor 50 in the central office terminal circuit COT1. Expandor 70a operates to restore the VF signals to their original dynamic range. From expandor 70a the voice frequency signals are coupled to the receiver in telephone 40 by way of hybrid 73a and drop 42.

Considering now the transmission of intelligence from the subscriber terminal equipment to the central office terminal equipment, voice frequency intelligence signals originating from the subscriber's telephone 40 on the channel established by STU1 and COT1 are fed by way of hybrid 73a to compressor 50a. Compressor 50a preforms the same function as compressor 50.

From compressor 50a the compressed voice frequency signals are fed through filter 52a to modulator 54a where they modulate a carrier signal of pre-selected frequency from an oscillator 94 to develop a double sideband amplitude modulated carrier signal for transmission from the subscriber terminal circuit STU1.

The purpose of filter 52a is the same as that described for filter 52. The frequency of the sinusoidal waveform produced by oscillator 94 is selected in accordance with the previously explained carrier frequency allocation scheme and may be 8 kHz for terminal circuit STU1.

The carrier signal transmitted from the subscriber terminal circuit STU1 and the carriers transmitted from the other subscriber terminal circuits are fed through the transmit section of the subscriber group terminal unit 36 to the transmission line 22 for transmission to the central office group terminal unit 34.

At the central office group terminal unit 34 the amplitude modulated carrier signal from the subscriber terminal circuit STU1 is coupled along with the other subscriber-transmitted carriers through the receive section of terminal unit 34 to the channel bandpass filter 62 in the central office channel terminal circuit COT1 as well as the corresponding channel bandpass filters in the remaining central office channel terminal circuits.

Similar to the channel bandpass filters 62a in the subscriber channel terminal circuits, the channel bandpass filters in the central office terminal circuits COT1-COT8 are so designed that each filter is tuned to and hence passes with the least attenuation the transmit carrier frequency and associated sidebands coming in from its associated subscriber channel terminal circuit while rejecting the other incoming carrier frequencies. Thus, for this example, the bandpass filter 62 in the central office channel terminal circuit COT1 will pass the modulated carrier frequency from the subscriber terminal circuit STU1, the bandpass filter in terminal circuit COT2 will pass the modulated carrier frequency from terminal circuit STU2, and so on.

Upon passing through filter 62 the modulated carrier signal is applied to and detected by detector 64. The resulting components of detection are applied to filter 66 which as an upper 3000 Hz cutoff. In performing the same function as filter 66a, filter 66 separates the desired voice frequency intelligence from the other components above 3000 Hz.

The VF signals passed by filter 66 are attenuated at attenuator 75 under the control of the AGC circuit 74 and are then amplified by amplifier 68. From amplifier 68 the VF signals are a.c. coupled to expandor 70 which restores the VF signals to their original dynamic range in the same manner as described for expandor 70a. From expandor 70 the voice frequency signals are coupled to the central office exchange equipment 46 by way of hybrid 73 and drop 44.

Channel terminal cicuits COT2-COT8 and STU2-STU8 operate in the same manner as described above for transmitting intelligence in both directions over line 22.

Figure 2:
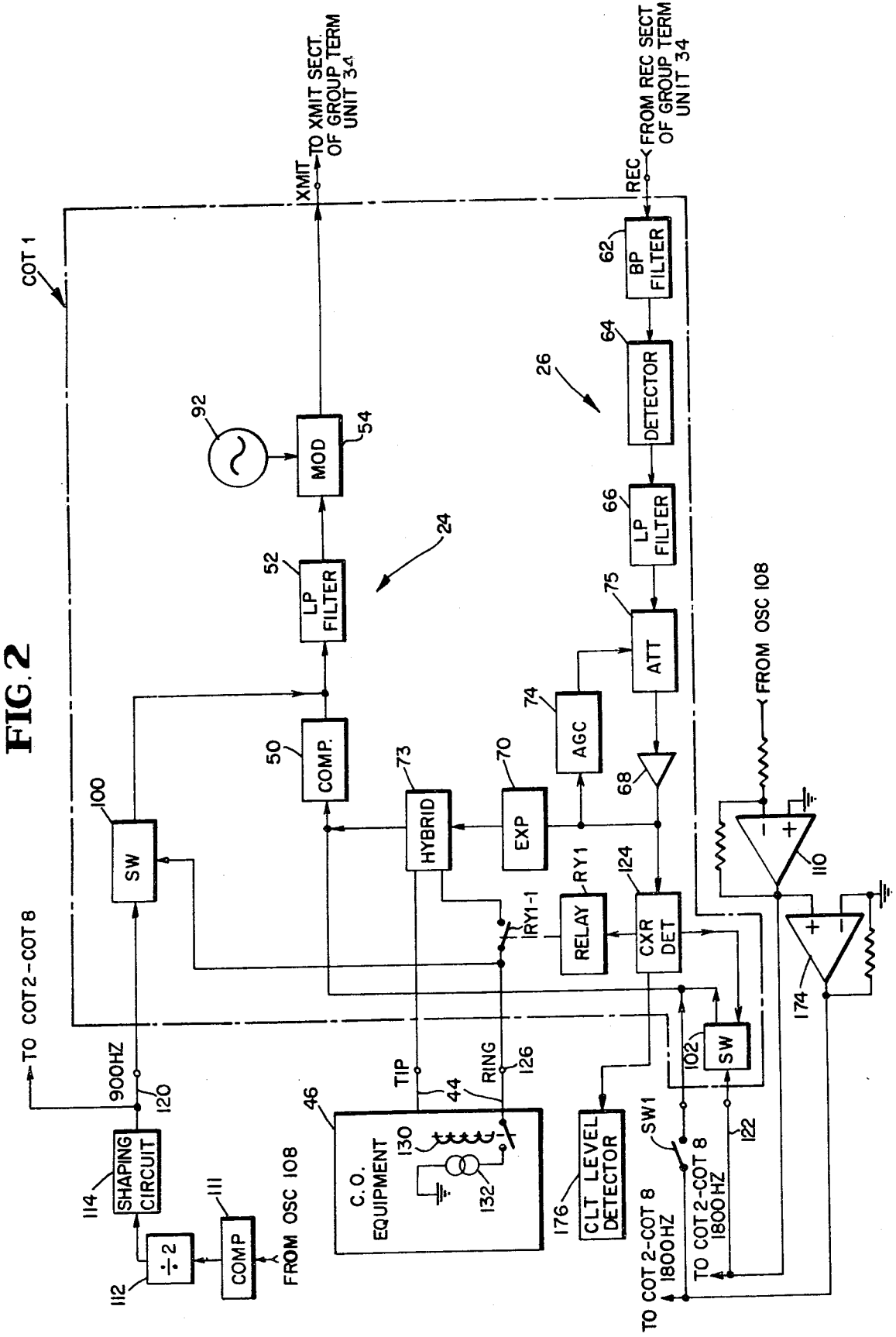
FIG. 2 is a schematic block diagram of one of the central office channel terminal circuits shown in FIG. 1.
Figure 3:
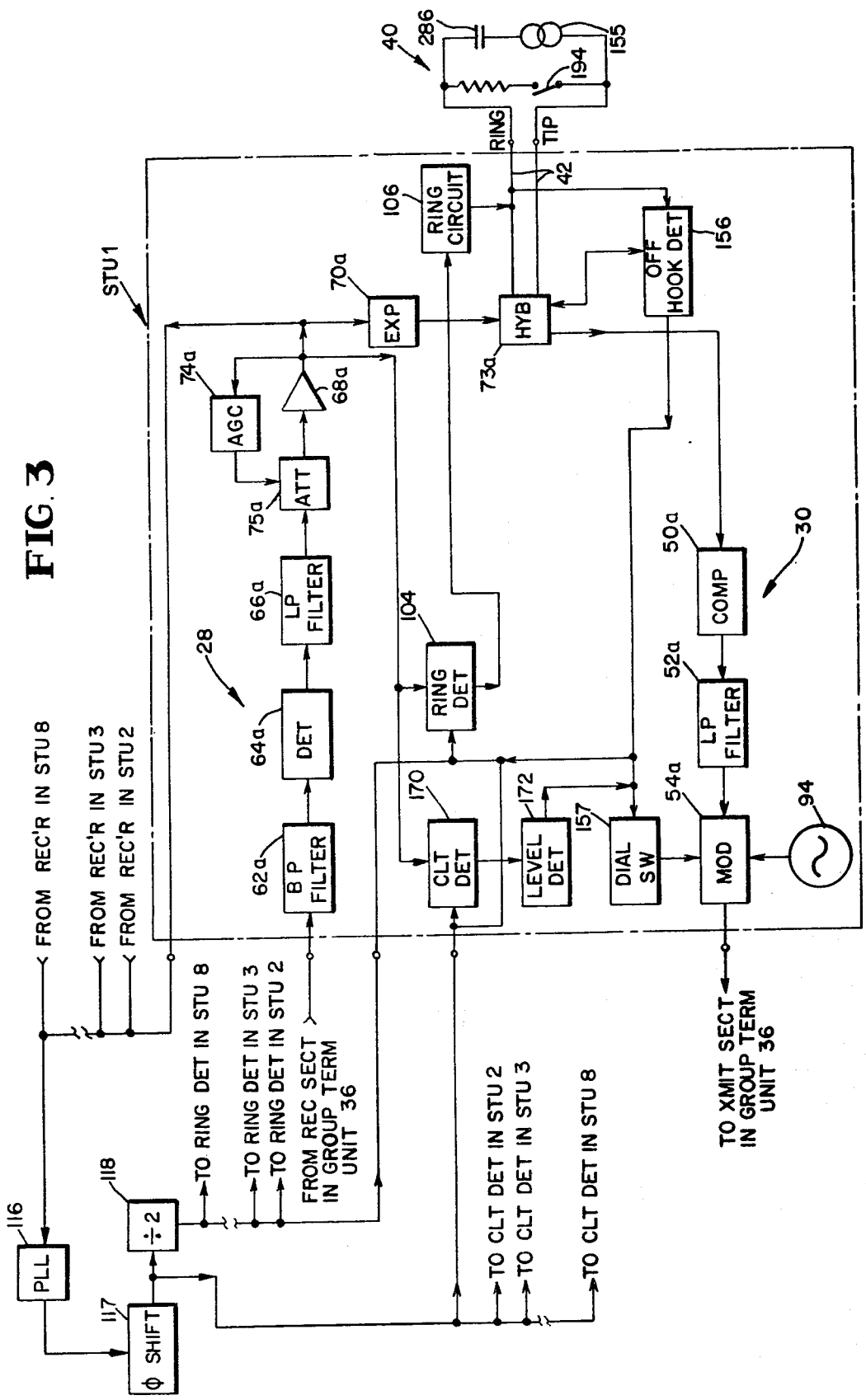
FIG. 3 is a schematic block diagram of one of the subscriber channel terminal circuits shown in FIG. 1.

In order to signal incoming calls for the subscribers served by carrier system 20, each of the central office channel terminal circuits COT1-COT8 is equipped with a pair of analog switches 100 and 102 (see FIG. 2), and each of the subscriber terminal circuits STU1-STU8 is equipped with a synchronous ring detector 104 and a ring circuit 106 as shown in FIG. 3. In addition, the central office terminal is equipped with an oscillator 108, an amplifier 110, a comparator 111, a frequency divider 112 and a shaping circuit 114 as shown in FIGS. 1 and 2, and the subscriber terminal is equipped with a phase locked loop 116, a 90 degree phase shifter 117, and a frequency divider 118 as shown in FIGS. 1 and 3. Oscillator 108, amplifier 110, comparator 111, frequency divider 112 and shaping circuit 114 form part of the equipment which is common to all of the central office channel terminal circuits COT1–COT8 at the central office, while the phase locked loop 116, phase shifter 117 and frequency divider 118 form part of the equipment which is common to all of the subscriber channel terminal circuits STU1–STU8.

Referring to FIGS. 1 and 2, oscillator 108 is connected to feed an a.c. sine wave signal of constant frequency to the input of amplifier 110 and also to the input of comparator 111. Comparator 111 converts the sine wave into an a.c. square wave of the same frequency and feeds it to frequency divider 112. The output of divider 112 is connected to shaping circuit 114, and the output of shaping circuit 114 is connected to the switch 100 in each of the central office terminal circuits by lines indicated at 120. The output of amplifier 110, on the other hand, is connected to the switch 102 in each of the central office terminal circuits COT1–COT8 by lines indicated at 122.

The a.c. square wave signal supplied by comparator 111 is frequency divided by divider 112, and the frequency-divided signal at the output of divider 112 is used as the a.c. alerting signal to signal incoming calls for the subscribers. Following frequency division the alerting signal is applied to shaping circuit 114 which provides the alerting signal with a sawtoothed wave shape. From the shaping circuit 114 the alerting signal is applied to switch 100 in each of the central office channel terminal circuits COT1–COT8.

In addition to being applied to comparator 111, the a.c. signal from oscillator 108 is amplified by amplifier 110 and applied to switch 102 in each of the central office terminal circuits COT1–COT8.

The operating frequency of oscillator 108 may be any suitable value which is preferably in-band (e.g., less than 3000 Hz). For example, the frequency of the a.c. signal generated by oscillator 108 may be 1800 Hz. Likewise, the frequency of the frequency divided alerting signal at the output of divider 112 may be of any suitable value. In this embodiment divider 112 divides the incoming frequency by two, thus making the frequency of the outgoing, alerting signal 900 Hz where the incoming oscillator frequency is 1800 Hz.

Thus, a 900 Hz alerting signal or tone is applied to the input of switch 100 in each central office channel terminal circuit, and a 1800 Hz signal or tone is applied to the input of switch 102 in each central office channel terminal circuit. By deriving the 900 Hz alerting signal by frequency dividing the oscillator's 1800 Hz signal, the 900 Hz signal will have a fixed, predetermined phase relationship with the 1800 Hz signal. This phase relationship is utilized in a manner to be described later on.

Both of the switches 100 and 102 are of the analog type that conduct or transmit a.c. signals without recitification upon being turned on. Switches 100 and 102 are each turned on to conduct the signals by applying a voltage of pre-determined polarity to their control electrodes. In the illustrated embodiment, positive polarity is used to turn the switches on.

As shown in FIG. 2, each of the central office channel terminal circuits is equipped with a carrier detecting relay driver 124. Driver 124 is used to operate an off-hook relay RY1 and is also connected to the control electrode of switch 102 for controlling operation of the switch. As shown, relay driver 124 is connected to the output of amplifier 68 and is operative to turn switch 102 off in response to the presence of the d.c. voltage component that results from reception and detection of the subscriber carrier that is transmitted up transmission line 22 from the companion subscriber channel terminal circuit. Relay driver 124 is responsive to the absence of this d.c. voltage component to turn switch 102 on.

In the illustrated embodiment each of the subscriber channel terminal circuits STU1–STU8 will transmit its subscriber carrier signal only when its associated telephone 40 is off-hook. Therefore, no carrier signal will be transmitted from each of the subscriber channel terminal circuits when its associated telephone 40 is on-hook.

From the foregoing it is clear that switch 102 will be turned on when the associated subscriber's telephone 40 is in its on-hook state and will be turned off when the telephone is brought off-hook.

The output of switch 102 is connected to the compressor 50 in its central office channel terminal circuit so that when the switch 102 is on it conducts the amplified 1800 Hz oscillator signal from amplifier 110 to compressor 50. From there, the 1800 Hz oscillator signal is passed by filter 52 to modulator 54 to amplitude modulate the central office-transmit carrier signal supplied by oscillator 92.

The switch 100 in each central office channel terminal circuit is turned on by the positive alternations of the central office ringing voltage which is applied to the ring terminal 126 by suitable central office ring generator equipment in the central office for signalling an incoming call. When switch 100 turns on it conducts the 900 Hz alerting signal to filter 52. Filter 52 passes the 900 Hz alerting signal to modulator 54 where the alerting signal amplitude modulates the carrier signal that is supplied by oscillator 92. In response to an incoming call for a subscriber served by the carrier system, therefore, the subscriber's assigned central office transmit carrier signal will be modulated by the 900 Hz alerting signal as well as the 1800 Hz oscillator signal.

The central office-transmit carrier signals, which are supplied by terminal circuits COT1–COT8, are continuously transmitted down line 22 in modulated or unmodulated form and are not interrupted for signalling purposes as are the subscriber-transmit carrier signals which are transmitted in the opposite direction from the subscriber channel terminal circuits STU1–STU8. These central office-transmit carrier signals are therefore continuously received and detected by their assigned subscriber channel terminal circuits.

At the remote subscriber terminal equipment, the output of the amplifier 68a in each of the subscriber channel terminal circuits STU1–STU8 is connected to the phase locked loop 116 which is common to all of the subscriber channel terminal circuits in the carrier system. Accordingly, all of modulation components recovered in each of the subscriber terminal circuits STU1–STU8 and having a low enough frequency to be passed by the low pass filter 66a in each subscriber channel terminal circuit will be applied to the phase locked loop 116.

The phase locked loop 116, however, is set to acquire lock with only one pre-selected frequency, namely the 1800 Hz frequency component which is supplied by oscillator 108 at the central office terminal. The phase locked loop therefore supplies only one output frequency, namely the 1800 Hz frequency if the 1800 Hz component is present at its input.

The 1800 Hz component will be present at the input of loop 116 if any one or more of the subscribers served by system 20 is on-hook. In such a case the central office-transmit carrier signal assigned to each of the on-hook subscribers will be modulated by the 1800 Hz oscillator signal. This 1800 Hz modulation is recovered in the appropriate subscriber channel terminal circuit and is fed to loop 116.

Thus, if any one or more of the subscribers served by system 20 is on-hook, loop 116 will be locked with the recovered 1800 Hz oscillator signal to establish the 1800 Hz signal apart from the other applied components of detection. In the illustrated embodiment a phase locked loop output is used to the outgoing 1800 Hz signal with a triangular waveform as indicated at 127 in FIG. 6. The 1800 Hz signal 127 is phase shifted by phase shifter 117 and is then applied to frequency divider 118 which is also common to all of the subscriber channel terminal circuits STU1-STU8. At the output of loop 116 signal 127 will be shifted 90 degrees out of phase with respect to the original 1800 Hz sine wave signal at the input of loop 116. Phase shifter 117 compensates for this phase shift by shifting signal 127 90 degrees so that it will be either in phase or 180° out of phase with the 1800 Hz sine wave signal at the input of loop 116.

As shown, the output of divider 118 is connected to the synchronous ring detector 104 in each of the subscriber channel terminal circuits STU1-STU8. Divider 118 divides the 1800 Hz frequency by two to feed a 900 Hz signal (indicated at 129 in FIG. 6) to the ring detector 104 in each of the subscriber channel terminal circuits STU1-STU8. If the carrier signal received by one of the subscriber channel terminal circuits STU1-STU8 is modulated by the interrupted 900 Hz alerting signal, the alerting signal will therefore be synchronously detected by the ring detector 104 in the receiving subscriber channel terminal circuit, and the signal resulting from synchronous detection is applied to ring circuit 106 for ringing the called subscriber's telephone.

Operation of the signalling equipment thus far described will now be considered in greater detail for the subscriber served by the channel terminal circuits COT1 and STU1. For convenience, this subscriber is referred to as the channel 1 subscriber, and the transmission channel established by terminal circuits COT1 and STU1 is identified as CH1 (see FIG. 1). In the embodiment shown in FIGS. 1-3, the transmission channel CH1 provides single party ringing. In a later embodiment, a bridged frequency ringing scheme is considered for a plurality of subscribers on a common, party line.

Before the incoming call arrives at the central office for the channel 1 subscriber, the switch 100 in central office channel terminal circuit COT1 will be off, there being no ringing voltage applied to ring terminal 126. Switch 102, however, will be turned on, provided that the channel 1 subscriber's telephone 40 is on-hook. The carrier signal transmitted from the channel terminal circuit will therefore be modulated by the 1800 Hz signal, but not the 900 Hz alerting tone.

The modulated carrier signal transmitted from the central office terminal circuit COT1 is received and detected in the subscriber channel terminal circuit STU1 to recover the 1800 Hz modulation. The recovered 1800 Hz frequency is passed by filter 66a and fed through amplifier 68a to the phase locked loop 116. Loop 116 will therefore be locked with the 1800 Hz oscillator signal to generate the 1800 Hz signal 127 even if the channel 1 subscriber is the only subscriber who is on-hook.

As a result, divider 118 feeds the 900 Hz signal 129 to one input of the ring detector 104 in terminal circuit STU1. Before a call arrives at the central office for the channel 1 subscriber, however, the 900 Hz alerting signal will not be applied to the other input of the ring detector in terminal circuit STU1. As a result, no synchronous detection will take place, and ring circuit 106 will not operate to ring the channel 1 subscriber's telephone even though the 900 Hz tone is present at the switching input of ring detector 104.

When the incoming call arrives at the central office, a central office relay 130 (see FIG. 2) is operated to connect a central office ring generator 132 to the ring terminal 126 of the central office terminal circuit COT1. This central office ringing generator and relay equipment is conventional. In the embodiment shown in FIG. 2 generator 132 is used to supply the same central office ringing signal frequency for signalling incoming calls for all of the subscribers served by system 20.

Figure 4:
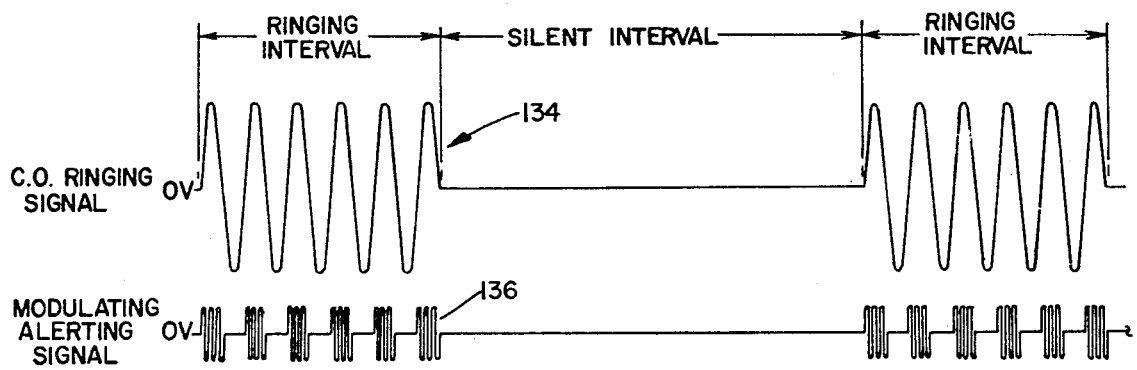
FIGS. 4, 5, 6 and 7 are time-voltage diagrams illustrating various signal voltages that occur in the operation of signalling an incoming call for one or more of the subscribers.

Generator 132 generates a typical central office a.c. ringing signal as indicated at 134 in FIG. 4. This central office ringing signal is applied to ring terminal 126 to signal the incoming call for the channel 1 subscriber and is periodic or interrupted in that it has the usual ringing and silent intervals which alternate with each other. During the ringing interval the central office ringing signal is present, and during the silent interval the ringing signal is absent as shown. The duration of the ringing interval customarily is one second, while the duration of the silent interval customarily is two seconds. The fixed frequency of the central office ring signal 134 is typically 20 Hz. Alternatively, it may be some other relatively low frequency.

As a result of applying the central office ringing signal 134 to ring terminal 126 to signal an incoming call for the channel 1 subscriber, switch 100 will be turned on by the positive alternations of ringing signal 134 and will be turned off by the negative alternations of the ringing signal. As a result, switch 100 will be alternately and cyclically turned on and off during the ringing interval of ringing signal 134. Additionally, switch 100 will be turned off throughout the silent interval, there being no ringing signal voltage applied during this period. For a central office ringing signal frequency of 20 Hz, switch 100 will be on for 25 ms half the ringing signal cycle and off for the other 25 ms half of the ringing signal cycle.

Figure 5:
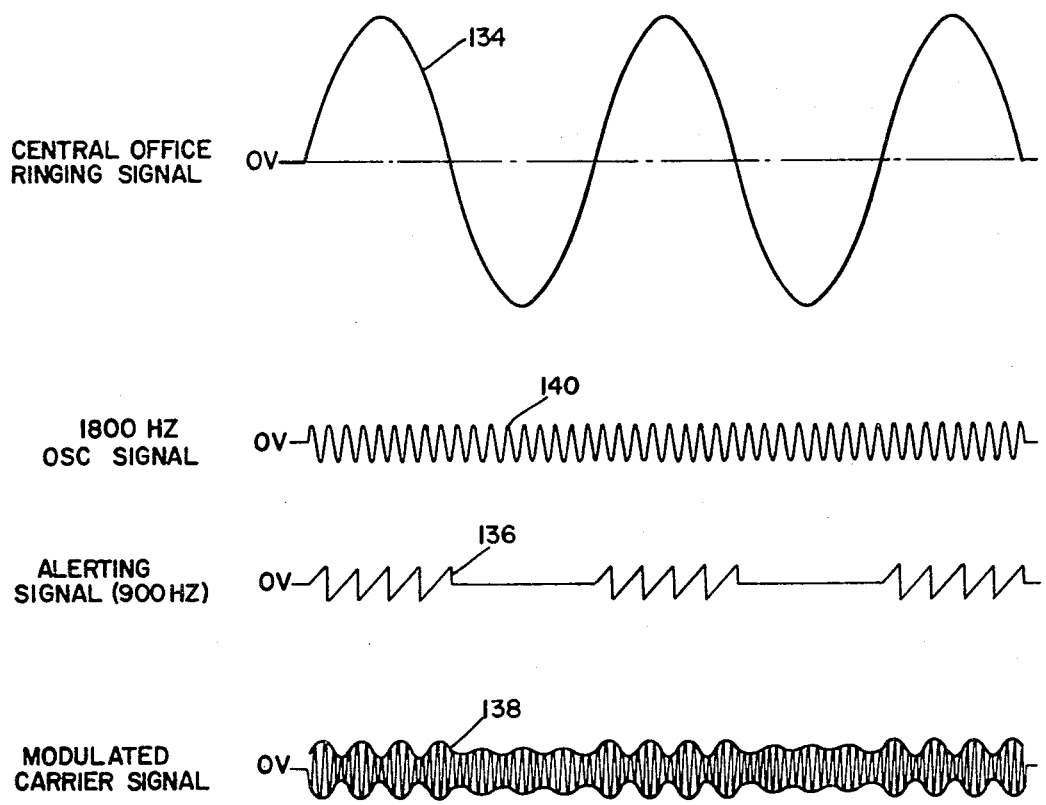

The alerting signal will therefore be conducted to modulator 54 only during the positive alternations of the central office ringing signal 134 as shown in FIGS. 4 and 5 where the interrupted alerting signal is indicated at 136.

As a result conduction of the 900 Hz alerting signal 136 will be intermittently interrupted at the central office ringing signal rate or frequency during the ringing intervals of ringing signal 134. The frequency of the alerting signal 136 (900 Hz in this example) is selected to be much higher than the frequency of the central office ringing signal 134 so that a multiplicity of cycles of the alerting signal occur in each half cycle of the central office ringing signal.

The 900 Hz alerting signal 136 will therefore be conducted in bursts to modulator 54, and the carrier signal supplied by oscillator 92 will therefore be amplitude modulated periodically by the interrupted alerting signal at the rate equal to the frequency of the central office ringing signal 134. The modulated carrier signal is indicated at 138 in FIG. 5. In response to an incoming call carrier signal 138 is therefore intermittently modulated by the 900 Hz signal 136 as well as being continuously modulated by the 1800 Hz signal (indicated at 140 in FIG. 5) until the channel 1 subscriber's telephone is transferred off-hook.

The modulated carrier signal 138 is received by the subscriber terminal circuit STU1, but not the other subscriber channel terminal circuits as indicated from the previous description. Thus, the modulated carrier signal 138 will be detected by the detector 64a in subscriber terminal circuit STU1 to produce the uninterrupted carrier frequency component, the interrupted 900 Hz alerting signal component and the continuous 1800 Hz signal component.

Filter 66a passes the recovered 900 Hz alerting signal 136 and the 1800 Hz oscillator signal 140, but rejects the carrier frequency component as well as any other frequencies that are higher than 3000 Hz. The interrupted 900 Hz alerting signal 136 will therefore be applied to the ring detector 104 in the called subscriber's terminal circuit STU1. This application of the recovered 900 Hz alerting signal 136 to one signal input terminal of the ring detector 104 in terminal circuit STU1 occurs while the 900 Hz signal 129 is being applied to the other signal input terminal of the ring detector.

Figure 6:
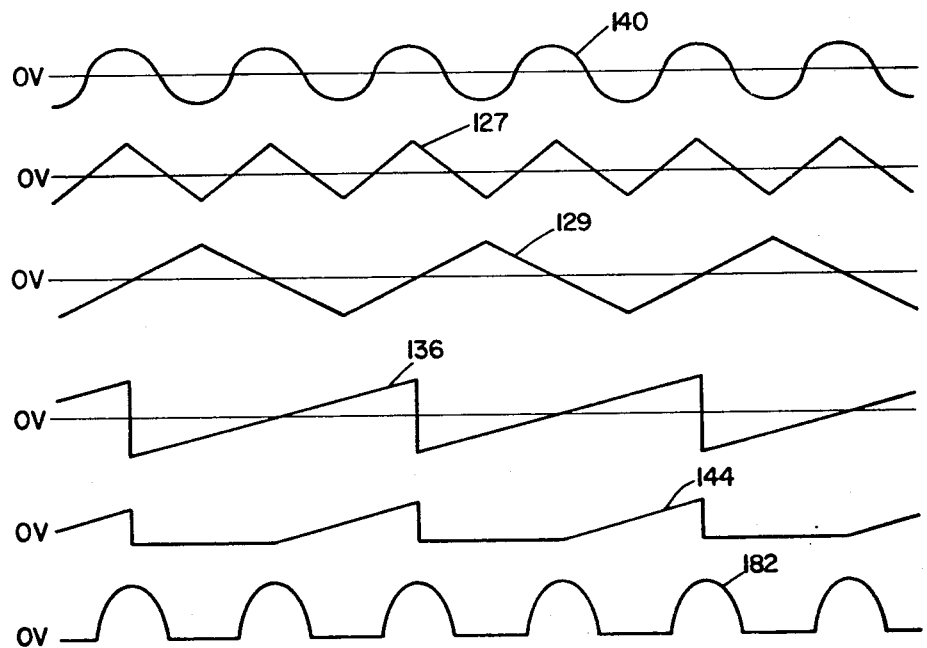

Because the interrupted 900 Hz alerting signal 136 is derived by frequency dividing the 1800 Hz oscillator signal 140, signal 136 will have a fixed, predetermined phase relationship with signal 140, and the zero crossovers of the 900 Hz alerting signal will be coincident with predetermined zero crossovers of the 1800 Hz oscillator signal. The zero crossovers of the interrupted alerting signal 136 will therefore be coincident with predetermined zero crossovers of the phase shifted 1800 Hz signal 127 at the output of phase shifter 117 as shown in FIG. 6. As a result, the zero crossovers of the interrupted 900 Hz alerting signal 136 will be coincident with the zero crossovers of the 900 Hz signal 129 at the output of frequency divider 118. Signals 136 and 129 will therefore be in phase or 180° out of phase with each other.

In either case, the result will be the synchronous detection of the interrupted alerting signal 136. In other words, synchronous detection of the alerting signal 136 occurs if the 900 Hz signal 129 is either in phase with signal 136 or 180° out of phase with signal 136.

The rectified or detected form of signal 136 appears at that output of ring detector 104 and is indicated at 144 in FIG. 6. In the illustrated embodiment signal 136 is half-wave recitifed by detector 104, but it could be full wave rectified if desired.

Figure 7:
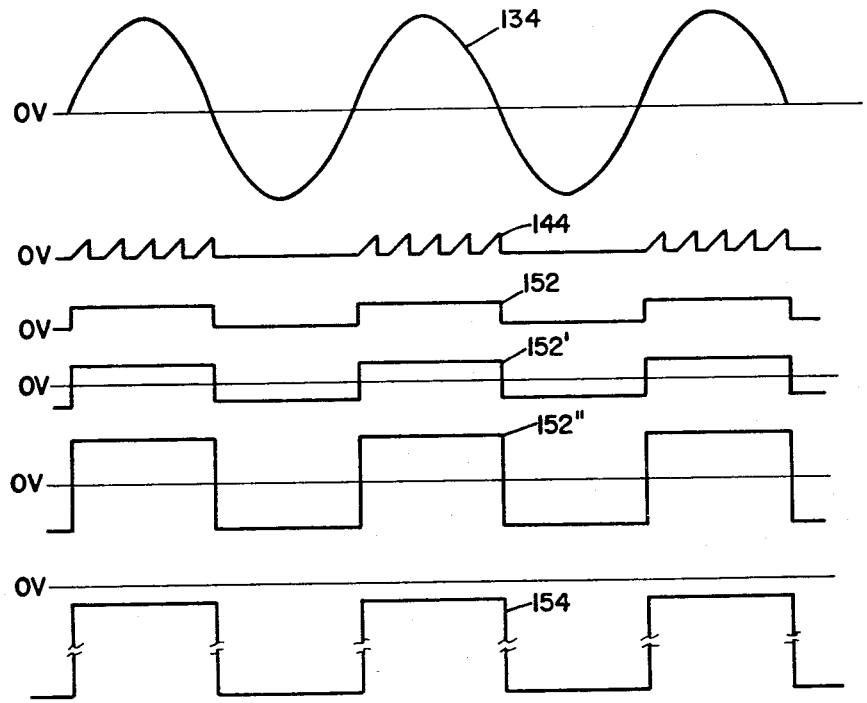

The detected alerting signal 144 will have the same frequency as signal 136 and will be periodically interrupted at the same rate as signal 136. The detected signal 144 will therefore be interrupted at the frequency of the central office ringing signal 134 as shown in FIG. 7.

Figure 8:
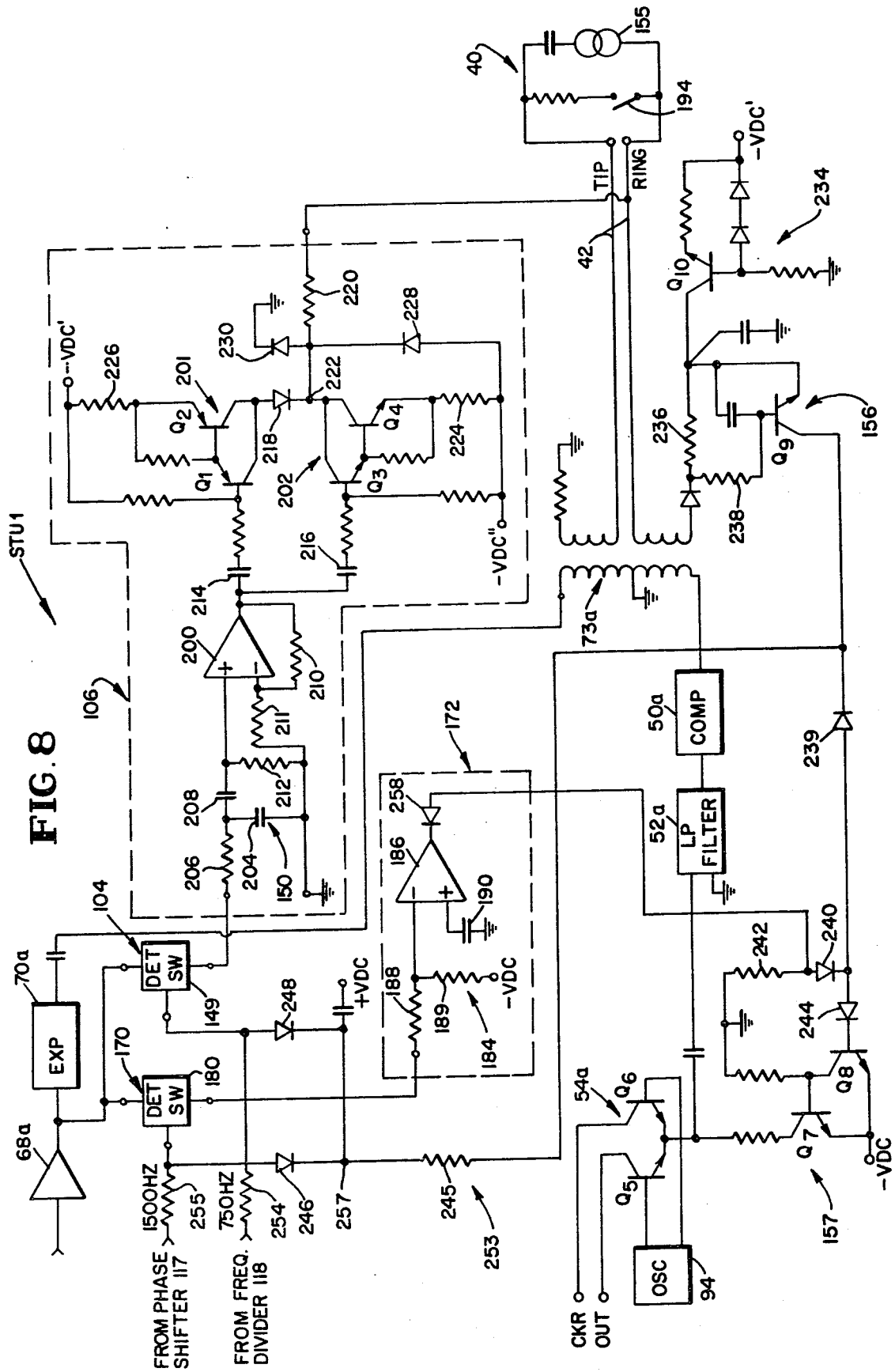
FIG. 8 is a schematic circuit diagram showing a portion of the above-mentioned subscriber channel terminal circuit in greater detail.

In the illustrated embodiment, ring detector 104 comprises an analog switch 149 (see FIG. 8). Switch 149 is turned on by the positive alternations of signal 129 and is turned off by the negative alternations of signal 129 to thereby recitify the alerting signal 136.

Although the recovered 1800 Hz signal is applied to ring detector 104 along with the 900 Hz alerting signal 136, the 1800 Hz frequency will not appear in the components of detection at the output of ring detector 104 because the 1800 Hz signal has one positive alternation and one negative alternation for each half cycle of the 900 Hz synchronizing signal 129. The positive and negative alternations of the 1800 Hz signal cancel each other. As a result, neither the 1800 Hz frequency nor the beat frequency (i.e., the difference between the 900 Hz synchronizing frequency and 1800 Hz) will be present at the output of ring detector 104.

From ring detector 104, the detected alerting signal 144 is fed to a low pass filter 150 (see FIG. 8) which may be of the RC type. Filter 150 may form a part of ring circuit 106 as shown. Alternatively, it may be considered as being separate from ring circuit 106.

In either case, filter 150 capacitively smooths and averages the detected alerting signal to develop a local square wave ringing signal as indicated at 152 in FIG. 7. The local ringing signal 152 is amplified or used as a switching signal in ring circuit 106 to develop an amplified square wave ringing signal 154 (see FIG. 7) whose voltage amplitude is large enough to operate the ringer (indicated at 155 in FIG. 3) in the called subscriber's telephone 40. Signal 154 is applied through ring side of drop 42 for signalling the incoming call.

As previously explained, the 900 Hz alerting signal 136 will not be modulated onto the called subscriber's carrier signal throughout the silent interval of the central office ringing signal 134. As a result, local ringing signals 152 and 154 will not be present during the silent intervals of the central office ringing signal 134. Operation of ringer 156 will therefore be intermittent, having the usual ringing and silent intervals corresponding to the ringing and silent intervals of the central office ringing signal 134.

The frequency cutoff of filter 150 is selected to be just high enough to pass all of the ringing frequencies normally used in a bridged frequency ringing scheme. One suitable cutoff of filter 150 is about 100 Hz. Filter 150 may be of any suitable circuit design.

As shown in FIG. 3, each of the subscriber channel terminal circuits is equipped with an off-hook detector 156. Detector 156 receives an input from the ring side of telephone 40 to sense the off-hook condition of the telephone.

Upon sensing the off-hook condition detector 156 operates a switch 157 which turns on the modulator 54a in its subscriber channel terminal circuit. As a result, modulator 54a emits its subscriber-transmit carrier signal which is transmitted up line 22 for reception and detection in the companion central office channel terminal circuit. The d.c. voltage component resulting from detection of the received carrier signal is sensed by relay driver 124. When this happens, the relay 124 operates relay RY1 to close contacts RY1-1 (see FIG. 2) in the ring side of the drop to the central office equipment. This completes the circuit to the central office equipment 46 and signals the central office equipment to remove the central office ringing signal 134 from the line (i.e., to trip the ring).

Considering the example of the incoming call for the channel 1 subscriber, the off-hook detector 156 in terminal circuit STU1 senses the off-hook condition when the channel 1 subscriber's telephone 40 is brought off-hook to answer the incoming call. Up to this time the modulator 54a in terminal circuit STU1 will be off, and no carrier signal is transmitted from terminal circuit STU1 as long as the channel 1 subscriber's telephone is on-hook.

Upon sensing the off-hook state of the channel 1 subscriber's telephone 40, the off-hook detector 156 in terminal circuit STU1 operates switch 157 to thereby turn on the modulator 54a in terminal circuit STU1.

Modulator 54a thereby produces the subscriber transmit carrier signal which is transmitted up line 22 to the central office terminal equipment where it is received and detected in the central office terminal circuit COT1.

The d.c. voltage component which results from the detection of the received carrier operates the relay driver 124 in terminal circuit COT1, and operation of relay driver 124, in turn, results in operation of relay RY1, causing the closure of contacts RY1-1 in terminal circuit COT1. This completes the circuit connection of terminal circuit COT1 to the central office equipment 46 and signals the central office equipment to operate relay 130 for disconnecting the ring generator 132 from terminal COT1. When this happens the central office ringing signal 134 will be removed and the switch 100 in terminal circuit COT1 will be switched to its off state, thus removing the 900 Hz modulation from the carrier signal that is transmitted from the modulator 54 in terminal circuit COT1.

In addition to operating relay RY1, the relay driver 124 also turns off switch 102 in terminal circuit COT1 upon sensing the d.c. voltage component that results from the detection of the carrier which is transmitted from terminal circuit STU1. As a result, the 1800 Hz oscillation signal will be removed from modulator 54 along with the 900 Hz signal when the channel 1 subscriber's telephone 40 is brought off-hook to answer the incoming call.

From the foregoing description it is clear that the frequency of the amplified ringing signal 154 is the same as the frequency of the unamplified local ringing signal 152 which is supplied at the output of filter 150. The frequency of the local ringing signal 152, in turn, corresponds to the rate or frequency at which the 900 Hz alerting signal 136 is interrupted by the central office ring signal 134. The frequency of the local ringing signal 152 and, hence, the amplified ringing signal 154 will therefore be the same as the frequency of the central office ring signal 134.

If the frequency of the central office ringing signal 134 is 20 Hz as previously mentioned, then the frequency of signals 152 and 154 will also be 20 Hz. If, on the other hand, the frequency of the central office ringing signal 134 is 30 Hz or is changed to 30 Hz then the frequency of the local ringing signals 152 and 154 will be 30 Hz. In summary, the frequency of the local ringing signals 152 and 154 will be the same as and will be determined by the frequency of the central office ringing signal 134. The local ringing signal 154 will therefore have the appropriate frequency for operating a telephone ringer that is tuned to the central office ringing frequency, whatever that frequency may be.

Accordingly, no modification to carrier system 20 is required and no change in telephone ringers is needed when it is desired to install the carrier system in place of a party line using bridged frequency ringing. Such a party line, by way of example, may serve two subscribers, one having a ringer tuned to 30 Hz and the other having a ringer tuned to 40 Hz. For party line service a separate central office ringing generator or ringing signal source is assigned to each of these subscribers, one supplying the 30 Hz central office ringing signal and the other supplying the 40 Hz central office ringing signal.

When installing carrier system 20 in place of the foregoing party line service the telephone of one of the two party line subscribers may be connected to one of the subscriber channel terminal circuits STU1–STU8, and the telephone of the other party line subscriber may be connected to a different one of the subscriber channel terminal circuits STU1–STU8 without changing or replacing the tuned ringers in either of the telephones. For example, the telephone having the 30 Hz tuned ringer may be connected to the subscriber channel terminal circuit STU1, and the telephone having the 40 Hz tuned ringer may be connected to the subscriber channel terminal circuit STU2. In such a case the 30 Hz central office ringing generator will be connected to the switch 100 in the central office channel terminal circuit COT1, and the 40 Hz central office ringing generator will be connected to the switch 100 in central office channel terminal circuit COT2. This arrangement is shown in FIG. 9 where the 30 Hz central office ringing generator is indicated at 160, the 40 Hz central office ringing generator is indicated at 161, the telephone having the 30 Hz tuned ringer is indicated at 40a and the telephone having the 40 Hz tuned ringer is indicated at 40b. The standard 20 Hz ringing generator (indicated at 132 in FIG. 2) may be used to supply the central office ringing signal (134) for the subscribers on remaining six transmission channels STU3–STU8 in carrier system 20. By this arrangement, individual service, rather than party line service, is supplied to the subscribers having telephones 40a and 40b.

If a call arrives at the central office for the subscriber assigned to telephone 40a the 30 Hz central office ringing signal will be fed to switch 100 in central office terminal circuit COT1. When this happens the 900 Hz alerting signal 136 will be applied to modulate the carrier signal sent out by central office terminal circuit COT1 and will be interrupted by the central office ringing signal from generator 160 at the generator's 30 Hz rate. The local ringing signal 154 developed in subscriber terminal circuit STU1 will therefore have a frequency of 30 Hz for operating the tuned, 30 Hz ringer in telephone 40a to signal the incoming call.

If a call arrives at the central office for the subscriber assigned to telephone 40b, the 40 Hz central office ringing signal will be fed to switch 100 in channel terminal circuit COT2. The 900 Hz alerting signal will therefore be applied to modulate the carrier signal transmitted from central office terminal circuit COT2 and will be interrupted by the 40 Hz central office ringing signal at the ringing signal's 40 Hz rate. The local ringing signal (154) developed in the subscriber channel terminal circuit STU2 will therefore be provided with a frequency of 40 Hz to operate the tuned, 40 Hz ringer in telephone 40b.

The signalling system just described is also effective to accommodate party line service with bridged frequency ringing on any one or more of the carrier system's transmission channels. For example, party line service with bridged frequency ringing may be provided on transmission channel 1 (terminal circuits COT1 and STU1) to serve two or more subscribers. To simplify the example assume that party line service is furnished to two subscribers on channel 1 as shown in FIG. 10.

In FIG. 10, the telephone for one of the party line subscribers is indicated at 40c, and the telephone for the other of the party line subscribers is indicated at 40d. For this example assume that telephone 40c is equipped with a 20 Hz tuned ringer and that telephone 40d is equipped with a 30 Hz tuned ringer. For a bridged frequency ringing scheme it will be noted that the ringer (not shown in FIG. 10) in each party line telephone is connected across the ring and tip sides of the subscriber drop 42.

The terminal circuits STU1 and COT1 require no modification to provide the party line service and bridged frequency ringing operation for the subscribers' telephones 40c and 40d. Accordingly, all of the central office and subscriber channel terminal circuits are the same as that shown in FIGS. 1–3.

To provide the different bridged frequency ringing frequencies (in this case 20 Hz and 30 Hz), two central office ringing generators 164 and 165 are used in place of the single generator 132. Generators 165 and 164 form a part of the central office exchange equipment 46 and are individually connectable to the switch 100 in the central office terminal circuits COT1 by operation of separate central office relays 166 and 167 as shown in FIG. 10. For the bridged frequency ringing scheme it will be appreciated that there will be as many central office ringing signal generators as there are subscribers on the party line.

It is also understood that each of the generators 164 and 165 generates a central office ringing signal corresponding to signal 134. However, the frequencies of the signals supplied by generator 164 and 165 will be different and will be matched with the frequencies to which the ringers in telephones 40c and 40d are tuned. In this example, generator 164 supplies the 20 Hz central office ringing signal, and generator 165 supplies the 30 Hz central office ringing signal.

If a call comes in for the subscriber who is assigned to telephone 40c, relay 166 will be operated to connect generator 164 to the switch 100 in terminal circuit COT1. The carrier signal transmitted from terminal circuit COT1 will therefore be modulated with the 900 Hz alerting signal, and this 900 Hz modulating signal will be interrupted at the frequency of the ringing signal supplied by generator 164, namely 20 Hz. The frequency of the local ringing signal 154, which is applied to the ring side of drop 42 to signal the incoming call, will therefore be 20 Hz. As a result, telephone 40c will be rung, but not telephone 40d.

If a call comes in for the subscriber assigned to telephone 40c, relay 167 will be operated to connect generator 165 to switch 100 instead of generator 164. As a result, the 900 Hz alerting signal 136, which is modulated onto the carrier signal coming out of terminal circuit COT1, will be interrupted at the 30 Hz rate which is the frequency of the central office ringing signal supplied by generator 165. The local ringing signal 154 will therefore be provided with a 30 Hz frequency so that it will ring telephone 40d, but not telephone 40c.

Referring back to FIGS. 1–3, each of the transmission channels established in carrier system 20 may optionally be equipped to provide for a channel loop testing operation. This is accomplished by equipping each of the subscriber channel terminal circuits STU1–STU8 with a further synchronous detector 170 and a level detector 172 and by equipping the central office terminal with one additional amplifier 174 and a level or threshold detector 176.

In each of the subscriber terminal circuits STU1–STU8 the output of amplifier 68a is connected to the signal input lead of synchronous detector 170, the output lead of detector 170 is connected to the input of level detector 172, and the output of level detector 170 is connected to the dial switch 157 (or off-hook switch as it is also called). The output of phase shifter 117, which is common to all of the subscriber terminal circuits STU1–STU8 is connected to the control input lead of the detector 170 in each of the subscriber terminal circuits so that the local 1800 Hz signal 127 is fed to the detector 170 in each of the subscriber terminal circuits STU1–STU8 as long as the 1800 Hz oscillator signal 140 is present at the input of the phase locked loop 116 and the phase locked loop is locked with signal 140.

At the central office the level detector 176 forms a part of the equipment that is common to the central office terminal circuits COT1–COT8 and is connected to the carrier-sensing relay driver 124 in each of the terminal circuits COT1–COT8. Amplifier 174 also forms a part of the equipment that is common to the central office terminal circuits COT1–COT8 as shown. In addition, a separate switch is provided for each of the central office channel terminal circuits COT1–COT8 for separately and selectively connecting the compressor 50 in each of the terminal circuits COT1–COT8 to the output of amplifier 174. The switches for the illustrated central office terminal circuits COT1, COT2 and COT8 are respectively indicated at SW1, SW2 and SW8 in FIG. 1. These switches are collectively referred to as SW1–SW8 for all eight of the central office terminal circuits COT1–COT8.

For the illustrated part of the system, the output of amplifier 174 is connected by switch SW1 to the input of the compressor 50 in terminal circuit COT1, by switch SW2 to the input of the compressor 50 in terminal circuit, by switch SW8 to the input of the compressor 50 in terminal circuit COT8, and so on.

If it is desired to perform a channel loop test on transmission channel 1, switch SW1 is closed. If it desired to perform a channel loop test on the transmission channel 2, which is established by terminal circuits COT2 and STU2, switch SW2 is closed, and so on.

By connecting amplifier 174 to amplifier 110, amplifier 174 will amplify the 1800 Hz oscillator signal and will feed the amplified oscillator signal to the compressor 50 in any selected one of the central office terminal circuits COT1–COT8 upon closure of the appropriate one of switches SW1–SW8. Switches SW1–SW8 are normally open and are selectively closed one at a time only when it is desired to conduct a channel loop test on selected transmission channels in the carrier system.

The voltage gains of amplifiers 110 and 174 are set so that there will be a pre-selected difference in signal levels at the outputs of the two amplifiers, with amplifier 174 supplying the larger amplitude signal as expected. The signal level difference resulting from these different oscillator signal strengths is sensed by the level detector 172 in the subscriber terminal circuit receiving the 1800 Hz signal. In response to receiving the stronger of the two 1800 Hz oscillator signals, the level detector 172 establish a condition for completion of the channel loop test in the manner described in detail below.

The level difference between the 1800 Hz signal at the output of amplifier 110 and the larger 1800 Hz signal at the output of amplifier 174 may be any suitable value that is sufficient to enable the level detector 172 to determine which of the two 1800 Hz signals is received. For example, the combined gain of amplifiers 110 and 175 may be set so that 1800 Hz oscillator signal at the output of amplifier 174 will produce sidebands that are 12 db down from the level of the carrier signal onto which the 1800 Hz signal is modulated. The gain of amplifier 110 alone may be set to provide the 1800 Hz signal with a level that is 20 db down from the level of the 1800 Hz signal at the output of amplifier 174.

This difference in the 1800 Hz signal levels at the outputs of amplifiers 110 and 174 results in a signal level difference of 10 db at the output of compressor 50 for the typical 2:1 compression ratio in the compressor. Upon arriving at the output of the compressor 50 in each central office channel terminal circuit, the smaller of the two 1800 Hz signals (i.e., the 1800 Hz that is amplified by amplifier 110 alone) will be down 10 db from the level needed to make sidebands 12 db down from the level of the carrier signal. The same 10 db difference will occur in the levels of the larger and smaller 1800 Hz signals at the output of amplifier 68a in each of the subscriber terminal circuits receiving the 1800 Hz signals.

The channel loop test operation for each of the eight transmission channels is the same. Accordingly, only channel loop test operation for channel 1 will be explained in greater detail below, it being understood that the following explanation is applicable to the remaining transmission channels in carrier system 20.

Switch SW1 is kept in its illustrated open position during normal operation when no channel loop test is conducted. As a result, the larger amplitude 1800 Hz CLT signal will not be fed to the central office terminal circuit COT1 from amplifier 174. However, the smaller amplitude 1800 Hz oscillator signal 140 will be applied to the central office terminal circuit COT1 and will be conducted through switch 102—assuming that the channel 1 subscriber's telephone 40 is on-hook—to modulate the central office transmit carrier signal 138, all in the manner previously described.

Upon reception and detection of carrier signal 138 at the subscriber channel terminal circuit STU1, the smaller amplitude 1800 Hz oscillator signal 140 is recovered, separated by filter 66a from the other components of detection having frequencies greater than 3000 Hz and fed to the signal input lead of synchronous detector 170 which may be a MOS analog switch (indicated at 180 in FIG. 8) similar to switch 149.

At this stage of operation, the recovered 1800 Hz signal will be the only component of detection having a frequency less than 3000 Hz so that only the 1800 Hz frequency will be present at the signal input of detector 170. The recovered 1800 Hz oscillator 140 will also be applied to phase locked loop 116 so that loop 116 will be locked with the 1800 Hz oscillator signal. The local 1800 Hz signal 127 will therefore be present at the output of loop 116, phase shifted 90° by phase shifter 117 and applied to the control lead of synchronous detector 170 throughout the time in which the recovered 1800 Hz oscillator signal 140 is present at the signal input lead of detector 170.

Because of the 90 degree phase shift, the local 1800 Hz signal 127 will be in phase with the recovered 1800 Hz oscillator signal 140 or 180 degrees out of phase with signal 140. The recovered oscillator signal 140 will therefore be synchronously detected by detector 170 with the result that the rectified form of the recovered 1800 Hz signal will be developed on the signal output lead of detector 170. The rectified 1800 Hz signal is indicated at 182 in FIG. 6. Half wave rectification is shown, but full-wave rectification of the recovered signal 140 may be established if desired.

The detector switch 180 is turned on to conduct half cycles of the recovered 1800 Hz signal 140 by alternations of one selected polarity (e.g., positive polarity) of the locally generated 1800 Hz signal 127. Since signal 127 may be in phase with the recovered 1800 Hz signal 140 or 180° with signal 140, then the detected signal 182 may be either positive as shown or negative. Level detector 172, however, is insensitive to polarity as will be explained shortly.

Level detector 172 may be of any suitable circuit design and is shown in the illustrated embodiment (see FIG. 8) to advantageously comprise a voltage divider 184 and a comparator 186. Voltage divider 184 is formed by a pair of resistors 188 and 189, the former being connected in the signal current path between the signal output lead of detector switch 180 and the negative input of comparator 186, and the latter being connected between the negative input of comparator 186 and the negative terminal of a suitable d.c. voltage source to divide down the incoming rectified signal 182.

As shown, the positive terminal of comparator 186 is connected to ground through a capacitor 190 so that the positive terminal is at a.c. ground to establish an a.c. ground potential reference. The rectified signal voltage developed at the junction between resistors 188 and 189 by the incoming signal 182 is compared with this reference.

Since the voltage divider resistor 189 is connected to a negative source of d.c. voltage (e.g., −6 VDC), the voltage developed at the junction between the voltage dividing resistors 188 and 189 may be either negative or positive with respect to ground depending on the amplitude of the rectified signal 182. If the divided-down signal voltage at the negative input of comparator 186 is negative with respect to ground, the output voltage of comparator is pulled positive. If, on the other hand, the voltage at the negative input of comparator 186 is positive with respect to ground, the voltage at the output of comparator 186 will be pulled negative.

For the given circuit design the difference in levels between the smaller amplitude 1800 Hz oscillator signal and the larger amplitude 1800 Hz CLT signal is such that the divided-down, signal voltage on the negative input of comparator 186 will be negative when only the smaller amplitude 1800 Hz signal 140 is synchronously detected by detector 170 and will be positive when the larger amplitude 1800 Hz signal (i.e., the one supplied from amplifier 174) is detected by detector 172.

With switch SW1 open only the smaller amplitude 1800 Hz signal 140 will be present for detection by detector 170. The output of comparator 186 will therefore be positive when the channel loop test is not being conducted and will become negative when switch SW1 is closed to conduct the test.

The negative voltage at the output of comparator 186 is used to cause the dial switch 157 to turn modulator 54a on while the channel 1 subscriber's telephone 40 is still on-hook. Dial switch 157 may be any suitable circuit design for this purpose and is normally under the control of the off-hook detector 156. However, when the output of comparator 186 is pulled negative, indicating detection of the stronger 1800 Hz signal which is used for the channel loop test, level detector 172 has the effect of overriding the control established by the off-hook detector 156 to cause switch 157 to turn on modulator 54a even though the subscriber's telephone is still on-hook. The positive voltage at the output of comparator 186 will have no controlling effect on switch 157, thus leaving switch 157 under the control of the off-hook detector 156 when only the weaker 1500 Hz oscillator signal 140 is detected by detector 170.

With switch SW1 open, therefore, dial switch 157 will remain under the control of the off-hook detector 156, thus keeping modulator 54a off while the channel 1 subscriber's telephone is on-hook. Accordingly, no carrier signal will be transmitted from the subscriber terminal circuit STU1 to feed the recovered 1800 Hz oscillator signal 140 back to the central office. In this regard, it will be noted that when the channel 1 subscriber's telephone 40 is on-hook, the 1800 Hz oscillator signal 140, which is recovered in the receiver 28 of terminal circuit STU1, will be conducted to modulator 54a by way of hybrid 73a, compressor 50a and filter 52a. However, the recovered 1800 Hz oscillator signal 140 will not be conducted back to the central office because modulator 54 will be held in its off condition by the operation of the off-hook detector 156 and dial switch 157.

When the subscriber's telephone 40 is on-hook, the recovered 1800 Hz signal 140, rather than being cancelled in hybrid 73a, will be conducted through the hybrid. The reason for this is that hybrid 73a will be terminated in the high impedance created by the open hook switch (indicated at 194) in telephone 40. As a result, the usual signal cancelling action will not occur in the autotransformer part of the hybrid on the subscriber's side of the hybrid. The recovered 1800 Hz oscillator signal 140 will therefore pass through the subscriber's side of hybrid 73a from the receiver to the transmitter without cancellation.

When switch SW1 is closed to conduct a channel loop test on channel 1, the larger amplitude 1800 Hz signal is bypassed around switch 102 and is conducted to the input lead of compressor 50 in the central office terminal circuit COT1. From there, this larger amplitude 1800 Hz signal (hereinafter referred to as the 1800 Hz CLT signal) is conducted through the compressor and filter 52 to modulator 54 where it amplitude modulates the carrier signal (138) being transmitted from terminal circuit COT1.

Upon reception and detection of the modulated carrier signal 138 in the subscriber terminal circuit STU1, the 1800 Hz CLT signal is recovered and fed to the synchronous detector 170 as well as the phase locked loop 116 which is already locked with the 1800 Hz oscillator signal 140.

As a result, the 1800 Hz CLT signal will be synchronously detected by detector 170. When this happens the amplitude of the detected or rectified 1800 Hz signal (originally indicated at 182 in FIG. 6) will be increased by virtue of the 10 db difference between the 1800 Hz CLT signal and the weaker 1800 Hz oscillator signal (140) at the output of amplifier 68a.

The increased amplitude of the resulting rectified 1800 Hz signal at the negative input of comparator 186 is sufficient to make the rectified signal more positive than the ground reference after it is divided down by divider 184 in the manner previously explained.

Upon reception and detection of the stronger 1800 Hz CLT signal, therefore, the voltage at the output of comparator 186 will be pulled negative, thereby causing dial switch 157 to turn on modulator 54a. When this happens, the subscriber carrier signal will be transmitted from the subscriber terminal circuit STU1 and will be amplitude modulated by the 1800 Hz CLT signal which is conducted through receiver 28, the subscriber's side of hybrid 73a, compressor 50a, and filter 52a.

Upon transmitting the modulated carrier signal from terminal circuit STU1, it will be conducted up line 22 to the central office terminal equipment where it is received and detected in the companion central office terminal circuit COT1. The 1800 Hz CLT signal will therefore be recovered at the output of detector 64 and will be conducted through filter 66, attenuator 75, amplifier 68 and the carrier-sensing relay driver 124.

From relay driver 124, the recovered 1800 Hz CLT signal is conducted to the channel loop test level detector 176 where its level is compared with a reference or threshold voltage. If the 1800 Hz CLT signal has been conducted through circuits that are in satisfactory working order, its level will be above the reference level or voltage in detector 176. This satisfactory condition will be sensed by detector 176 which may be equipped with a signalling device (e.g., a lamp) to indicate the satisfactory condition.

The level detector 176 will also sense the unsatisfactory condition in which the level of the returned 1800 Hz CLT signal is lower than the pre-selected threhold as well as the unsatisfactory condition in which the 1800 Hz CLT signal is not returned to the CLT level detector. In such a case the CLT detector circuitry is such that it will prevent illumination of the signalling lamp mentioned above, and it may also be equipped with additional indicating lamps or other signalling devices that give an positive indication of a faulty condition.

From the foregoing it will be appreciated that the channel loop test operation just described is effective to check the signal paths in the channel terminal circuits for continuity and proper audio level. If there is a break in the signal path that the 1800 Hz CLT signal follows, the 1800 Hz signal will not be returned to the CLT level detector 176, and this faulty condition is sensed and indicated by detector 176 as explained above. Detector 176 will also sense and indicate an unsatisfactory audio level condition in which the level of the returned 1800 Hz CLT signal is too low.

It will also be appreciated that the addition of a relative small number of inexpensive circuits and components affords an effective channel loop test in which the 1800 Hz CLT signal is conducted through the complete transmitter in the central office terminal circuit, through the transmission line 22 in the central-office-to-subscriber direction, through the complete receiver in the companion subscriber channel terminal circuit, through the subscriber side of the hybrid in the subscriber channel terminal circuit, through the complete transmitter in the subscriber channel terminal circuit, through the transmission line in the subscriber-to-central office direction, and through the complete receiver in the receiving central office terminal circuit. Accordingly, the transmission line and all of the transmitters and receivers in the central office and subscriber channel terminal circuits will be checked with the singular exception of the hybrid in the central office terminal circuit.

In addition to filter 150, ring circuit 106 includes an operational amplifier 200 and a pair of darlington circuits 201 and 202. In this embodiment, filter 150 comprises a capacitor 204 and a resistor 206 connected in the manner shown.

The filtered ringing signal 152 at the output of filter 150 is coupled by a capacitor 208 to amplifier 200 for amplification. Resistors 210 and 211 set the gain of amplifier 200, and resistor 212 provides bias for the amplifier. Capacitor 208 has the effect of shifting the signal voltage waveform so that it will have negative and positive alternations rather than being all positive. The shifted waveform is indicated at 152' in FIG. 7. The positive and negative peak voltages of signal 152' are of equal absolute magnitude as shown.

The signal voltage 152' at the output of amplifier 200 will be the same as the input signal voltage 152' except that the former will be voltage amplified. The signal voltage at the output of amplifier 200 therefore has the same positive and negative alternations as the input signal voltage 152'.

From the output of amplifier 200 the amplified ringing signal 152" is coupled by a capacitor 214 to the base of the input transistor Q1 in darlington 201 and by a separate capacitor 216 to the base of the input transistor Q3 in darlington 202. The output transistors for darlingtons 201 and 202 are indicated at Q2 and Q4, respectively.

As shown, the collectors of the output transistors Q2 and Q4 are d.c. coupled together through a diode 218, and these coupled collectors develop the amplified local ringing signal 154 which is conducted through a resistor 220 to the ring side of drop 42 and hence to the ring terminal of telephone 40.

Emitter bias for the transistors in darlington 201 is supplied from the negative terminal of a suitable d.c. voltage source VDC', and emitter bias for the transistors in darlington 202 is supplied from the negative terminal of a separate d.c. voltage source VDC".

The transistors in darlington 201 are of the PNP type and are therefore turned on by the negative alternations of signal 152" and turned off by the positive alternations of signal 152". Conversely, the transistors Q3 and Q4 in darlington 202 are of NPN type and are consequently turned on by the positive alternations of signal 152" and turned off by the negative alternations of signal 152". Darlingtons 201 and 202 therefore conduct alternately in a complementry fashion.

When transistor Q2 is on and transistor Q4 is off for the negative half cycle of signal 152", the output ringing signal voltage (indicated at 154 in FIG. 7 and appearing at the junction 222 of the collector leads for transistors Q2 and Q4) will approach the value of the negative d.c. voltage −VDC' which is made significantly less negative than the negative d.c. −VDC". For example, −VDC' may be about −16 VDC and −VDC" may be about −200 VDC to provide the ringing signal voltage 154 with sufficient amplitude for operating the ringer 155 in telephone 40.

When transistor Q4 is turned on and transistor Q2 is turned off for the positive half cycle of signal 152" the ringing signal voltage 154 will approach the value of the negative d.c. voltage −VDC" which may be about −200 volts as indicated above. The a.c. waveform of ringing signal voltage 154 is therefore square, has the same frequency as signal voltages 152 and 152' and has negative peak amplitude values approaching VDC' and VDC". The local ringing signal voltage 154 effectively represents a voltage amplification of signal voltage 152". In essence, the combined circuit of darlingtons 201 and 202 operates as an overdriven amplifier.

From the foregoing description it is apparent that darlingtons 201 and 202 combine to operate as a switching circuit in which the negative voltage sources −VDC' and VDC" are alternately and cyclically switched in to establish the local ringing voltage 154.

Due to capacitor 208, ring circuit 106 is insensitive to the polarity of the detected alerting signal 144 which is fed into filter 150 from detector 104.

One advantage of using the Q2 and Q4 collectors as outputs for darlington circuits 201 and 202 is that there will be no collector current flow and consequently no waste of power during the ring circuit's idle condition when no alerting signal is detected. In this regard it will be noted that both of the darlingtons will be turned off in absence of a detected signal at the input of filter 150.

Characteristic of operational amplifiers, the peak voltage of signal 152" at the output of amplifier 200 will be limited by the magnitude of d.c. voltage supply which is applied for operating the amplifier. For example, the peak output voltage will be about 5 volts.

By virtue of the circuit connections between amplifier 200 and the emitter of transistor Q4, the emitter voltage of transistor Q4 will, in turn, be limited by the voltage at the output of amplifier 200 and will be equal to the voltage at the output of amplifier 200 less the voltage drops occurring along the signal current path that passes through the base-emitter junction of transistor Q4. Thus, the emitter voltage of Q4 will be about 1 volt less than the voltage at the output of amplifier 200 owing mainly to the drop across the base-emitter junction of transistor Q4.

By limiting the emitter voltage in this manner, the emitter current drawn by transistor Q4 will also be limited and will depend upon the selected value of the transistor's emitter resistor 224. By simply making the size of resistor 224 large enough the emitter current can be kept below an excessive value that might cause damage to the darlington's transistors. In this way, the darlington circuit 202 has a built-in current-limiting feature to permit relatively cheap bipolar transistors to be used in the darlington circuit. It will be appreciated that darlington 201, being of the same circuit design and having the same connections as darlington 202, has the same built-in current limiting feature as the one just described for darlington 202. The emitter resistor for darlington 201 is indicated at 226 in FIG. 8.

Still referring to FIG. 8, ring circuit 106 is provided with diodes 228 and 230 which are connected in the manner shown to provide protection against current surges that result from lightning. Diodes 228 and 230 will become forward biased by these surges to conduct the surges to ground and thereby prevent them from forward biasing transistors Q2 and Q4.

In particular, diode 228 will be forward biased by one polarity of the surge voltage to clamp junction 222 to the negative voltage of source −VDC". This keeps the collector of transistor Q4 from becoming forward biased to limit the excursion in one direction.

At the same time, diode 228 will prevent the collector-emitter voltage of transistor Q4 from exceeding −200 volts or whatever is selected for −VDC".

Diode 230 will be forward biased on the opposite polarity of the surge voltage, and when it becomes forward biased, it will clamp junction 222 to ground, thereby preventing the collector-emitter voltage from exceeding the voltage supply of −200 volts.

When telephone 40 is brought off-hook to close hook switch 194, direct current will flow in drop 42 to cause diode 218 to become reverse biased. Reverse biasing of diode 218 prevents leakage of current from the ring side of the line, thereby preventing the occurrence of an unbalanced condition.

In the illustrated embodiment, modulator 54a is shown in FIG. 8 to of the differential amplifier type having a pair of emitter coupled NPN transistors Q5 and Q6. The audio signal from filter 52a is fed to the coupled emitters of transistors Q5 and Q6 to modulate the carrier frequency oscillator carrier signal which is continuously and differentially applied to the bases of transistors Q5 and Q6 even when the modulator is turned off and not transmitting. The modulated carrier signal is taken from the collectors of transistors Q5 and Q6 as shown.

Still referring to FIG. 8, the dial or off-hook switch 157 comprises a pair of transistors Q7 and Q8. The emitter of transistor Q7 is connected to the negative terminal of the d.c. voltage source VDC. The collector of transistor Q7 feeds the coupled emitters of the modulator's transistors Q5 and Q6. Transistor Q7 operates as switch for controlling the supply of emitter current to transistors Q5 and Q6 and is turned on and off by transistor Q8.

As shown, the collector of transistor Q8 feeds the base of transistor Q7. When transistor Q8 is turned off its collector voltage rises to turn on transistor Q7. When transistor Q7 is turned on it conducts current to the emitters of transistors Q5 and Q6, causing the carrier signal to be transmitted from the collectors of transistors Q5 and Q6. When transistor Q5 and Q6 are in this state, being fed with emitter current from transistor Q7, modulator 54a will turn on to transmit the carrier signal.

When transistor Q8 is turned on, transistor Q7 will turn off, thus interrupting the supply of emitter current for transistors Q5 and Q6. Under this condition modulator 54a will be turned off in its non-transmitting state in which no transmission of the carrier signal occurs.

As shown in FIG. 8, the emitter of transistor Q8 is also connected to the negative terminal of voltage source VDC. Transistor Q8 is turned on and off by changing its base voltage.

Still referring to FIG. 8, the collector of a further transistor Q9 feeds the base of transistor Q8. Transistor Q9 forms a part of the off-hook detector 156. When nook switch 194 is closed by transferring telephone 40 to its hook-off state, the circuit will be completed for conducting direct current through the ring and tip leads of drop 42. This direct current is supplied from the collector of a transistor Q10 which is connected in the manner shown to establish a current source 234.

Emitter current for transistor Q10 is supplied by voltage source −VDC'. Upon closing hook switch 194 the d.c. collector current supplied by transistor Q10 will be conducted through a resistor 236, the lower coil of hybrid 73a on the subscriber's side of the line, the ring side of drop 42, hook switch 194, the tip side of drop 42 and the upper hybrid coil on the subscriber's side to ground.

As shown the emitter of transistor Q9 is connected to the collector of transistor Q10 at the junction between one terminal of resistor 236 and the collector of transistor Q10. The other terminal resistor 236 is connected by a base biasing resistor 238 to the base of transistor Q9.

Before hook switch 194 is closed by bringing telephone 40 off hook, transistor Q9 will be turned off. As a result no collector current will be supplied by transistor Q9 for conduction through diodes 239 and 240 and a resistor 242 to ground. Transistor Q8 will therefore be in its conductive state (which is its normal condition) in which base current is conducted through a further diode 244.

With transistor Q8 turned on, transistor Q7 will be turned off. Modulator 54a will therefore be turned off to prevent the transmission of the carrier signal from the subscriber channel terminal circuit.

When hook switch 194 is closed by bringing telephone 40 off-hook, the circuit is completed for conducting direct current from source 234 through the ring and tip sides of drop 42 as previously explained. Transistor Q9 will therefore be biased on, and since the collector current of transistor Q10 is the emitter current for transistor Q9, the voltage on the collector of transistor Q9 will be pulled more negative than the d.c. voltage that is applied by source VDC to the emitter of transistor Q8. In this regard it will be noted that the −VDC' voltage is more negative than the negative voltage of source VDC. For example, the former may be −16 VDC while the latter may be −6 VDC.

When transistor Q9 is turned on, therefore, the base voltage for transistor Q8 will be pulled more negative than the emitter voltage of transistor Q8. When this happens, transistor Q8 will turn off, causing transistor Q7 to turn on. As a result modulator 54a turns on to transmit its carrier signal back to the central office. From this description it will be appreciated that transistor Q9 operates as a current detector for detecting or sensing the flow of direct current (also called loop current) in drop 42.

As shown in FIG. 8, the collector of transistor Q9 is connected through a resistor 245 to the cathodes of two additional diodes 246 and 248, and the anodes of diodes 246 and 248 are respectively connected to the control leads of detector switches 180 and 149. These diodes are used in conjunction with resistor 245 and two additional resistors 250 and 252 to keep detector switches 149 and 180 from conducting when telephone 40 is brought off hook. This operation provides a local ring trip to remove the local ring signal voltage 154 and also the 1800 Hz signal upon transferring telephone 40 to its off hook state as will now be described.

When telephone 40 is on-hook to place transistors Q9 in its non-conducting state, a capacitor 251 (FIG. 8) will be discharged to a value that reverse biases diode 246 and 248. As a result, the on-off operation of detector switch 180 will be under the control of the locally generated 1800 Hz signal voltage 127 and the operation of detector switch 149 will be under the control of the locally generated 900 Hz signal voltage 129. The peak voltages of these two signals are typically ±5 volts.

When telephone 40 is brought off-hook, causing transistor Q9 to conduct, the collector voltage of transistor Q9 will be sufficiently negative to cause diode 246 to become forward biased on the positive alternations of the locally generated 1800 Hz detector switching signal and to also cause diode 248 to become forward biased on the positive alternations of the local 900 Hz switching signal. When diodes 246 and 248 become forward biased a voltage divider 263 (see FIG. 8) will be established by resistor 245 and the parallel combination input resistors 254 and 255, the former being in the current path to the control lead of detector switch 149, and the latter being in the current path to the control lead of detector switch 180.

With diodes 246 and 248 forward biased, the voltage divider 253 will operate to hold the voltage on the control leads of detector switches 149 and 180 negative at about the value which is set by divider 253 at junction 257. This negative voltage on the control leads of switches 149 and 180 prevents the switches from conducting, it being recalled that switch 149 and 180 will conduct only when the control lead voltages become positive.

By holding detector switch 149 off, the local ring signal voltage 154 will be removed to provide the local ring trip. By holding detector switch 180 off, any chance of the 1800 Hz signal being heard by the interconnected parties is avoided.

As shown in FIG. 8, diodes 258, 242 and 244 are connected in series between the output of comparator 186 and the base of transistor Q8 in dial switch 157. When level detector 172 fails to sense the stronger 1800 Hz CLT signal, the voltage at the output of comparator 186 will be positive to reverse bias diode 258. Accordingly, the output of comparator 186 will have no effect on the base voltage of transistor Q8.

When level detector 172 senses the stronger 1800 Hz CLT signal the voltage at the output of comparator 186 is pulled negative to forward bias diode 258. This negative voltage at the output of comparator 186 will be about −5.4 volts for a 6 volts power supply. When diode 258 becomes forward biased, therefore, the voltage at the anode of diode 240 will become clamped to approximately −4.8 volts, for the −5.4 volts comparator output mentioned above.

The −4.8 volts at the anode of diode 240 is not positive enough to keep transistor Q8 in conduction. As a result, transistor Q8 will turn off when the stronger 1800 Hz CLT signal is received.

When transistor Q8 is turned off, transistor Q7 turns on to turn on modulator 54a as previously explained. The carrier signal will therefore be transmitted from the subscriber terminal circuit, and 1800 Hz CLT signal, which is received and conducted to modulator 54a by way of hybrid 73a, will be applied to modulate the transmitted carrier.

When the larger amplitude 1800 Hz CLT signal is removed by opening switch SW1 at the end of the channel loop test, the voltage at the output of comparator 186 will resume its positive value, thus reverse biasing diode 258 and allowing transistor Q8 to turn on again, provided that transistor Q9 is non-conducting.

Figure 11:
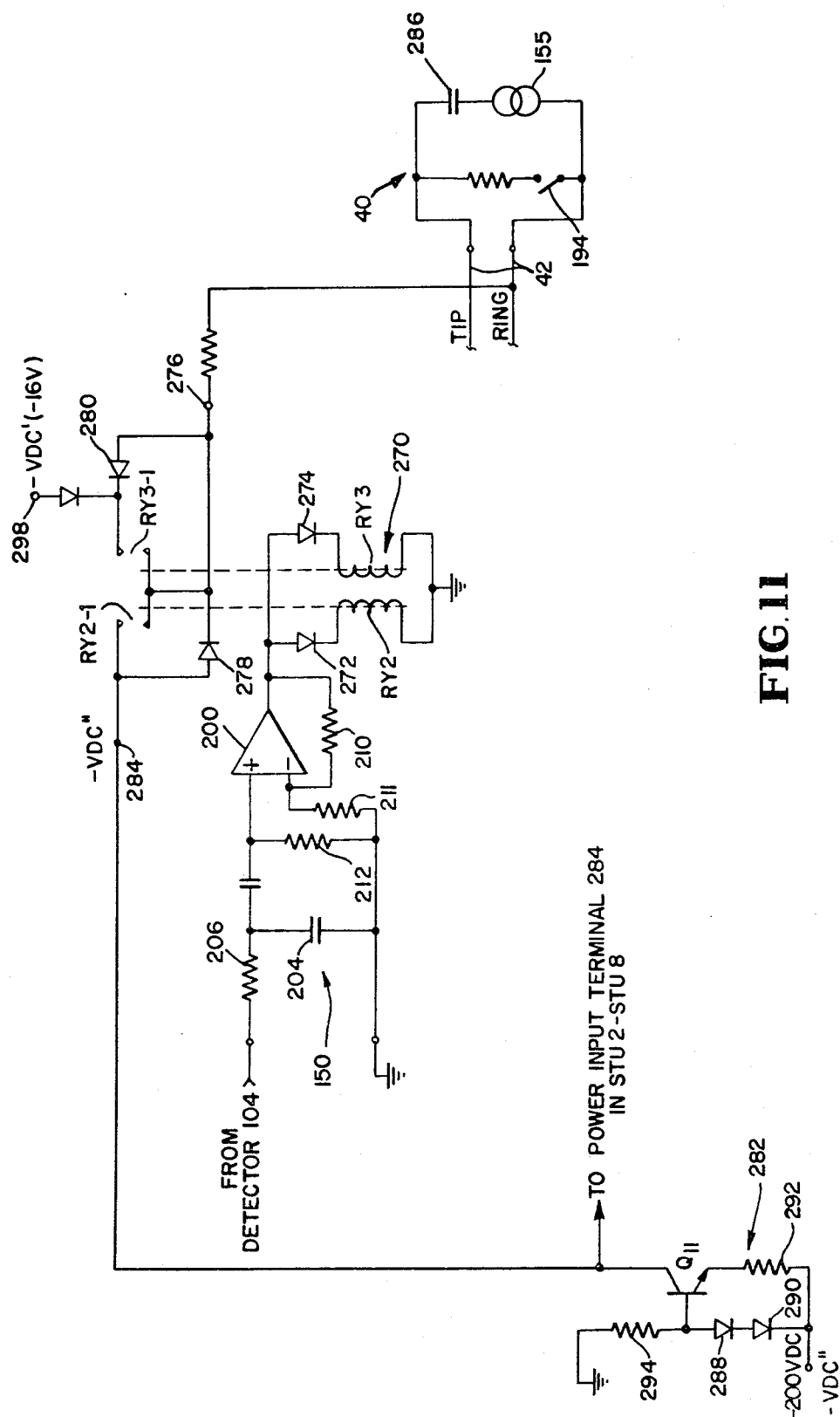
FIG. 11 is a schematic circuit diagram showing a second embodiment of the ring circuit for use in the subscriber channel terminal circuit mentioned above.

In the embodiment shown in FIG. 11, the darlington circuits 201 and 202 are replaced by a relay switching circuit 270. The two ring circuits shown in FIGS. 8 and 11 are otherwise the same, and to the extent that they are, like reference numerals have been applied to designate like components.

As shown in FIG. 11, the relay switching circuit 270 comprises a pair of relays RY2 and RY3 which combine to form an A type relay. The windings for relays RY2 and RY3 are each connected between the output of amplifier 200 and ground. Relay RY2 has a set of normally open contacts RY2-1, and relay RY3 also has a set of normally open contacts RY3-1 as shown.

A diode 272 in series with the winding of relay RY2 allows current flow in only one direction through the winding of relay RY2. Diode 272 is poled so that relay RY2 is energized only by the positive alternations of the signal voltage 152″ at the output of amplifier 200.

Another diode 274 connected in series with the winding of relay RY3 is poled oppositely with respect to diode 272. Relay RY3 will therefore be energized only on the negative alternations of the signal voltage 152″ at the output of amplifier 200. Relays RY2 and RY3 therefore operate in a complementry fashion to alternately close contacts RY2-1 and RY3-1.

As shown, the movable elements of contacts RY2-1 and RY3-1 are connected together to feed a common pin or junction 276 which is connected through a resistor to the ring side of drop 42.

When contacts RY2-1 close, they connect the −VDC″ voltage source to junction 276 to apply a suitable negative d.c. voltage such as −200 volts to junction 276. When contacts RY3-1 close, they connect the −VDC′ voltage source to junction 276 to apply the less negative voltage (e.g., −16 VDC) to the junction. The alternate switching of the two d.c. voltage sources establishes the local ringing signal voltage 154 which is applied to operate the ringer 155 in telephone 42. Diodes 278 and 280, which are connected in the manner shown, provide arc and lightning supression.

If telephone 40 is brought off-hook during the ring cycle (i.e., when contacts RY2-1 are closed) excessive current may be drawn from the source VDC″ due to the low impedance load that is established by closure of the hook switch 194. This high current may cause damage to and premature failure of contacts RY2-1.

To avoid this objectionable condition a special current limiter 282 is connected between the negative terminal of the d.c. voltage source VDC″ and the power input pin or terminal 284 of the relay switching circuit 280 as shown. Pin 284 connects to the stationary contact element of the contact set RY2-1 to apply the −200 volts. Limiter 282 operates to limit the direct current that can be conducted through contacts RY2-1 and the load established by telephone 40.

Current limiter 282 is common to all of the subscriber terminal circuits STU1-STU8 and is used to supply direct current to all of the relay switching circuits (270) in terminal circuits STU1-STU8.

As shown in FIG. 11, current limiter 282 has a simplified inexpensive circuit design and mainly comprises a bipolar NPN transistor Q11 and a pair of diodes 288 and 290. The negative terminal of source VDC″ is connected to the emitter of transistor Q11 through an emitter resistor 292. Diodes 288 and 290 are connected in series between the base of transistor Q11 and the negative terminal of source VDC″. A resistor 294 connected between ground and the base of transistor Q11 feeds the transistor's base with biasing current.

The collector of transistor Q11 is connected to and feeds the input terminal 284 of the relay switching circuit 270 as shown. Transistor Q11 is normally conducting to feed collector current to contacts RY2-1 as long as the transistor's emitter current is below a predetermined value.

For the circuit connections shown, the voltage on the base of transistor Q11 will normally be about 0.6 volts less negative than the voltage on the emitter of the transistor Q11. The transistor's emitter voltage is determined by the drop across the emitter resistor 292 and hence by the size of resistor 292 and the amount of emitter current drawn by the transistor. The amount of emitter current will depend upon the amount of collector current, and the amount of collector current in turn will vary inversely with the impedance of the load established in telephone 40. The transistor's collector current and emitter current may be regarded as approximately equal.

As the amount of emitter current drawn by transistor Q11 increases, the voltage drop across emitter 292 increases, thus making the transistor's base voltage less negative. If, for example, the emitter resistor voltage drop increases from 0.1 volt to 0.2 volt due to an increase in the transistor's emitter-collector current, then the transistor's base voltage will become less negative changing from −199.3 volts to −199.2 volts.

Because of the connections of diodes 288 and 290, however, the difference between the voltage at the base of transistor and the fixed voltage of −200 volts at source VDC" cannot exceed approximately 1.2 volts, there being a virtually fixed drop of about 0.6 volt across each diode. In other words, the transistor's base voltage cannot become less negative than about −198.8 volts because of diodes 288 and 290.

As the sum of the transistors base-emitter voltage drop of about 0.6 volts and the emitter resistor voltage drop approaches the maximum 1.2 volt drop allowed by diodes 288 and 290, transistor Q11 will conduct less and will begin to turn off. As a result, the collector current pulled by transistor Q11 will reach a limit that cannot be exceeded.

Assume that telephone 40 is brought off hook to close hook switch 194 at the moment contacts RY2-1 are closed. The collector-emitter current of transistor Q11 will be conducted through the closed hook switch and the relatively light load may tend to draw a large enough current that would produce a 0.8 volt drop across resistor 292. The difference left over between 0.8 volt and the 1.2 volt maximum is not enough base-emitter forward bias for causing transistor Q11 to conduct.

In the foregoing manner limiter 282 operates to limit the magnitude of current that the telephone load can draw and prevents the flow of excessive current and consequently damage to the relay contacts.

Because of the circuit design for limiter 282, the collector of transistor Q11 may be connected to each of the corresponding power input terminals (284) in the other subscriber terminal circuits STU2-STU8 to limit the supply of current to the relay switching circuits (270) in the other subscriber terminal circuits. Current limiter 282 also has the effect of saving power. For this purpose a corresponding current limiter (not shown) may be connected to supply current to the −16 VDC power input terminal 298 in the relay switching circuit 270 for each of the subscriber terminal circuits.

From the previous description of the signalling circuitry it will be noted that if the telephone 40 for one of the subscriber's is off-hook at the time that a call for him arrives at the central office, the calling party will receive a busy signal and the central office equipment will not operate to connect the central office ringing generator (e.g., generator 132) to the called subscriber's central office channel terminal circuit. As a result the switch 100 in the called subscriber's central office channel terminal circuit will not conduct the 900 Hz signal.

When the subscriber is off-hook at the time a call for him comes into the central office, therefore, neither the 1800 Hz signal nor the 900 Hz will be applied to modulate the carrier signal that is transmitted from the off-hook subscriber's central office channel terminal circuit. Accordingly, no 900 Hz signal will be recovered in the off-hook subscriber's subscriber channel terminal circuit, so that no 900 Hz synchronous detection occurs. Furthermore, the previously described local ring trip action will keep the off-hook subscriber's ring detector 104 from synchronously detecting the 900 Hz if for some reason it happens to be present. In either case, ringing of a subscriber's telephone 40 will not take place if the telephone is off-hook.

It also will be appreciated that the purpose of the phase locked loop 116 is to establish the recovered 1800 Hz signal apart from the other components that result from demodulation of the central office carriers. In this way, only the 900 Hz frequency will be applied to the control lead of each detector switch (149 and 180) in each of the subscriber channel terminal circuits to properly facilitate the synchronous detection of the desired signals.

It also will be noted that each pair of companion central office and subscriber terminal circuits (e.g., COT1 and STU1, COT2 and STU2, and so on) and the common transmission line 22 combine to represent a separate carrier circuit over which intelligence and other signals (e.g., the oscillator and alerting signals 140 and 136) are transmitted by means of a carrier wave.

From the foregoing description it will also be appreciated that one of the important features of the embodiment shown in FIGS. 1–8 is a signalling operation whereby two signals are applied to modulate just one carrier signal, namely the central office-transmit carrier signal that is assigned to the called subscriber when a call arrives for him at the central office.

In the illustrated embodiment, these modulating signals are of different pre-selected frequencies, one frequency being an integral multiple of the other. Alternatively, two signals of the same pre-selected frequency could be used to modulate the called subscriber's central office-transmit carrier signal. This alternate signalling mode may be accomplished by making the levels of the two modulating signals different from each other when a call for the subscriber arrives at the central office and by sensing the level difference at the called subscriber's subscriber channel terminal circuit following synchronous detection of one of the two signals similar to the previously described channel loop test operation.

Figure 12:
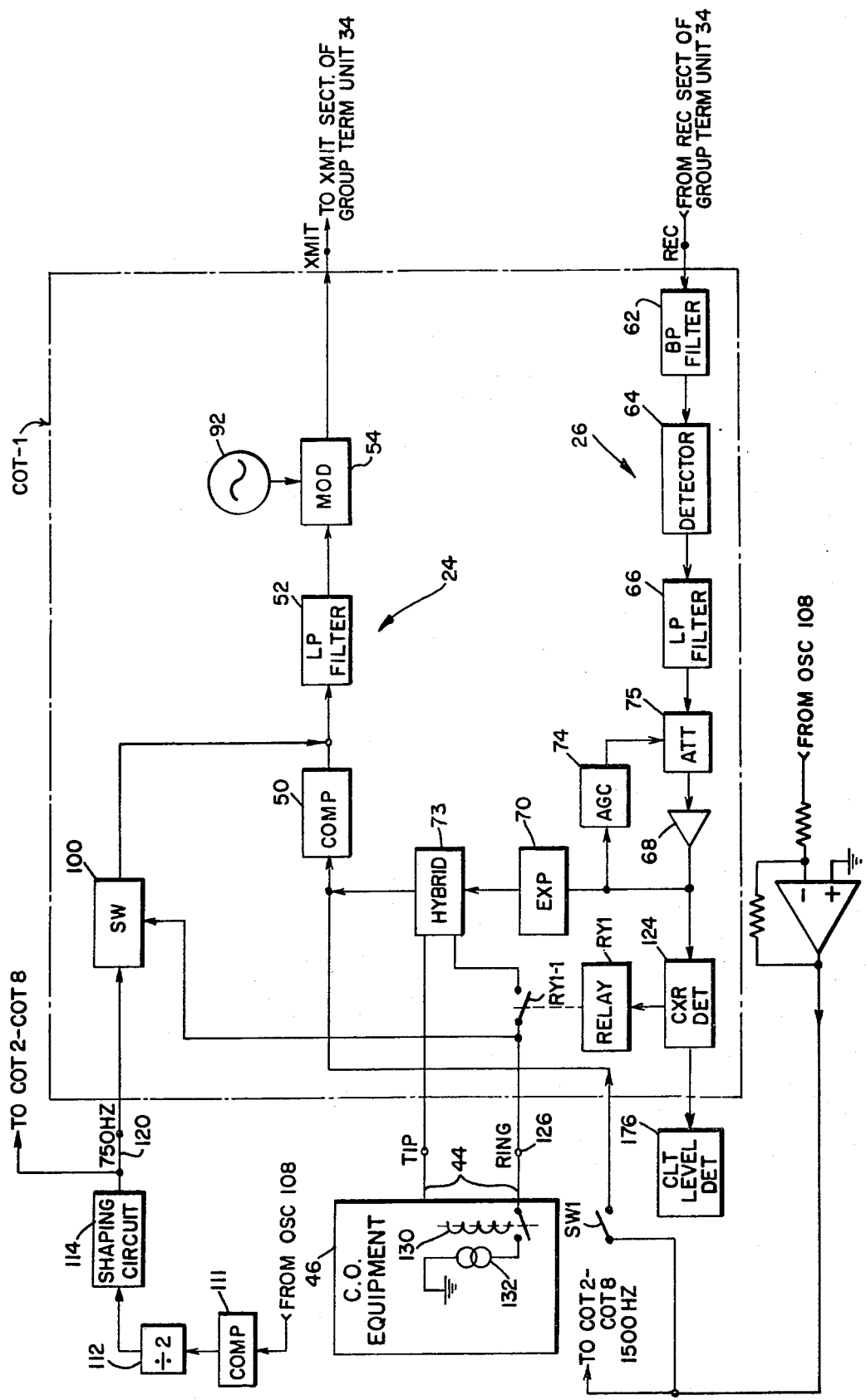
FIGS. 12 and 13 are schematic block diagrams similar to FIGS. 2 and 3 and showing another embodiment of the central office and subscriber terminal circuitry for alerting a called subscriber to an incoming call.
Figure 13:
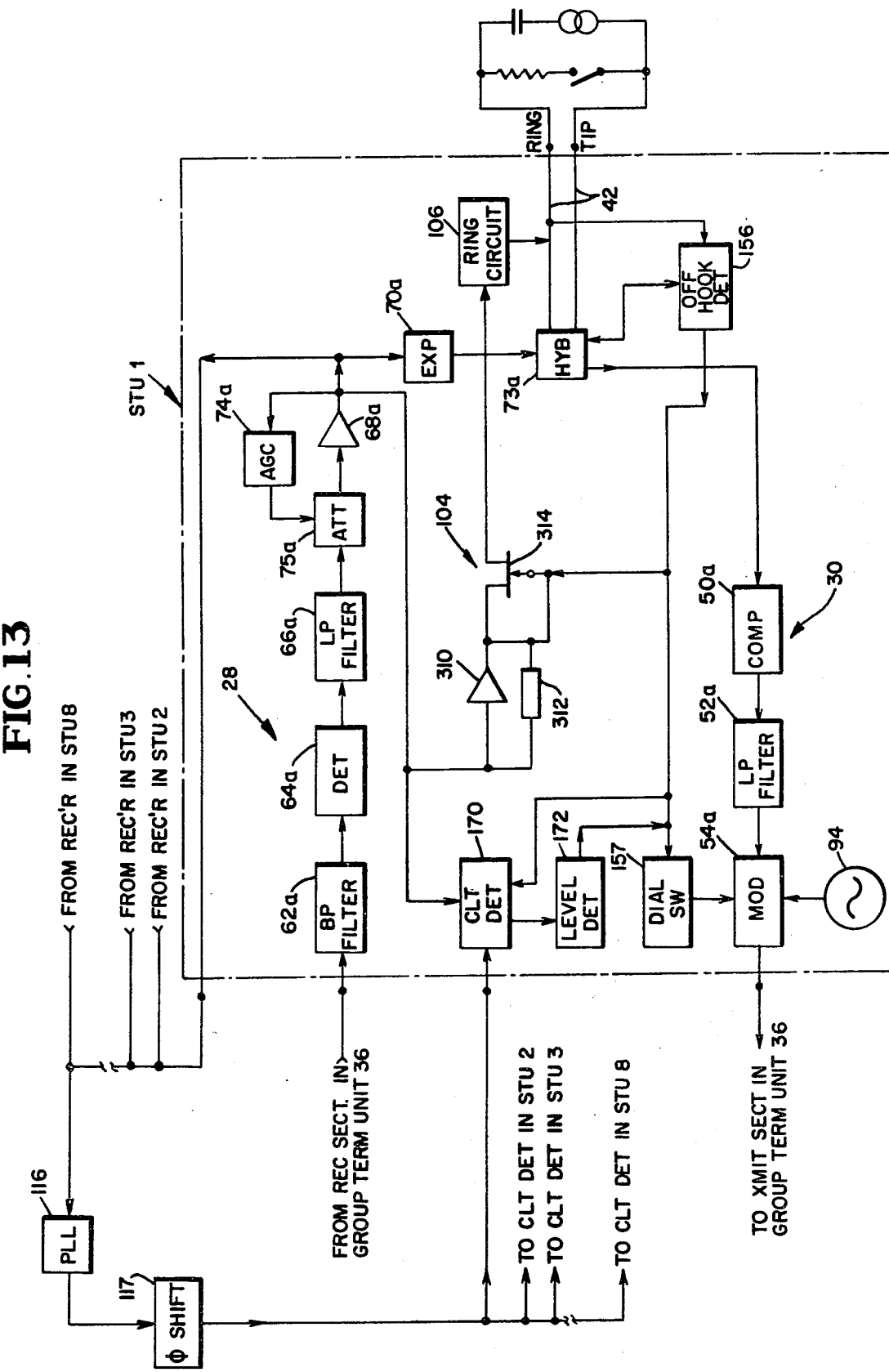

In the embodiment shown in FIGS. 12 and 13 only one ringing or alerting signal is utilized to alert a called subscriber to an incoming call rather than using two signals to signal the incoming call as disclosed in the preceding embodiment of FIGS. 1–8. To accomplish this a narrow bandpass filter 310 (see FIG. 13) is added to each of the subscriber terminal circuits STU1–STU8, and the frequency divider 118 is eliminated from the group terminal that is common to the subscriber terminal circuits. Additionally, the central office terminal equipment is modified by eliminating the switch 102 from each of the central office terminal circuits COT-1–COT8 and by using just one amplifier 312 (see FIG. 12) in place of the two amplifiers 110 and 174 that are used in the preceding embodiment. Apart from these changes the central office and subscriber terminal equipment for the embodiment of FIGS. 12 and 13 is the same as that shown in the embodiment of FIGS. 1–8.

To the extent that the embodiment of FIGS. 12 and 13 is the same as the preceding embodiment shown in FIGS. 1–8 like reference numerals have been applied to designate like circuits and components.

As shown in FIG. 13, filter 310 may be of the active type having an amplifier and a suitable reactive feed-back 312. The output of the AGC amplifier 68a is connected to the input of filter 310. Filter 310 is tuned to pass only the 900 Hz alerting signal.

The output of filter 310 is connected to both the signal input lead and the switching control lead of the synchronous ring detector 104 to thereby apply the same signal to both leads. In the embodiment of FIG. 13 detector 104 may be a FET (field effect transistor) switch 314 rather than the particular type of analog switch described in the preceding embodiment.

As shown, the output of filter 310 is connected to both the gate and drain electrodes of FET 314 to apply the same 900 Hz signal. A single signal voltage, rather than two separate signals, is therefore applied to the drain and gate of the FET synchronous detector. The circuit may be designed in such a manner that FET 314 is normally non-conducting and is turned on only by the positive alternations of the 900 Hz alerting signals. Alternatively, FET 314 may be of the type that is turned on only by the negative alternations of the 900 Hz alerting signal. In either case the 900 Hz signal will synchronously detect itself.

In the circuit shown in FIG. 13, the detected or rectified 900 Hz signal appears on the source of FET 314 and is fed to the ring circuit 106 for operating the ring circuit 106 in the previously described manner to generate the a.c. voltage that is used to ring the called subscriber's telephone.

The signalling operation for the embodiment shown in FIGS. 12 and 13 will now be considered, using the example of the channel 1 subscriber who is served by the channel terminal circuits COT1 and STU1.

When an incoming call arrives at the central office for the subscriber served by the channel terminal circuits COT1 and STU1 the central office relay 130 is operated as previously described to connect ring generator 132 to the ring terminal 126 of the central office terminal circuit COT1. The central office ringing signal supplied by ring generator 132 will therefore be applied to switch 100, causing switch 100 to be turned on by the positive alternations of the ringing signal 134 and to be turned off by the ringing signal's negative alternations as previously explained.

The 900 Hz alerting signal will therefore be conducted to modulator 54 only during the positive alternations of the central office ringing signal 134. As a result, conduction of the 900 Hz alerting signal will be periodically interrupted at the central office ringing signal rate or frequency during the ringing intervals of ringing signal 134. The channel 1 carrier signal will therefore be amplitude modulated periodically by the interrupted alerting signal at the rate equal to the frequency of the central office ringing signal 134.

In the embodiment of FIGS. 12 and 13 the interrupted 900 Hz alerting signal will be the only signal applied to modulate the called subscriber's carrier signal to alert the subscriber to an incoming call. This signalling operation is in contrast to the one described in the embodiment of FIGS. 1–8 where the called subscriber's carrier signal is modulated by two signals to alert the called subscriber to an incoming call. In the embodiment shown in FIGS. 12 and 13 the 1800 Hz oscillator signal will only be applied when one or more of the switches SW1–SW8 is selectively closed to conduct a channel loop test.

Upon receiving and detecting the called subscriber's modulated carrier signal in terminal circuit STU1, the interrupted 900 Hz alerting will be recovered and passed by filter 310 which acts to separate the 900 Hz signal from the other VF components of detection that pass through the low pass filter 66a. The 900 Hz signal will therefore be applied to FET 314 to synchronously detect itself.

The waveform of the resulting rectification will be the same as the detected signal 144 and will be applied to ring circuit 106 for developing the ringing voltage 154 for operating the called subscriber's ringer.

As shown in FIGS. 12 and 13 the circuitry for conducting the channel loop test may be the same as that shown in the embodiment of FIGS. 1–8. Operation of this circuitry is also the same as that previously described and is initiated by closing any selected one of the switches SW1–SW8, depending upon the channel to be tested.

As shown in FIG. 13 the output of the off-hook detector 156 is connected to the gate of the FET 314 to prevent FET 314 from conducting and to thus squelch the interrupted alerting signal when the subscriber's telephone is brought off-hook.

Figure 14:
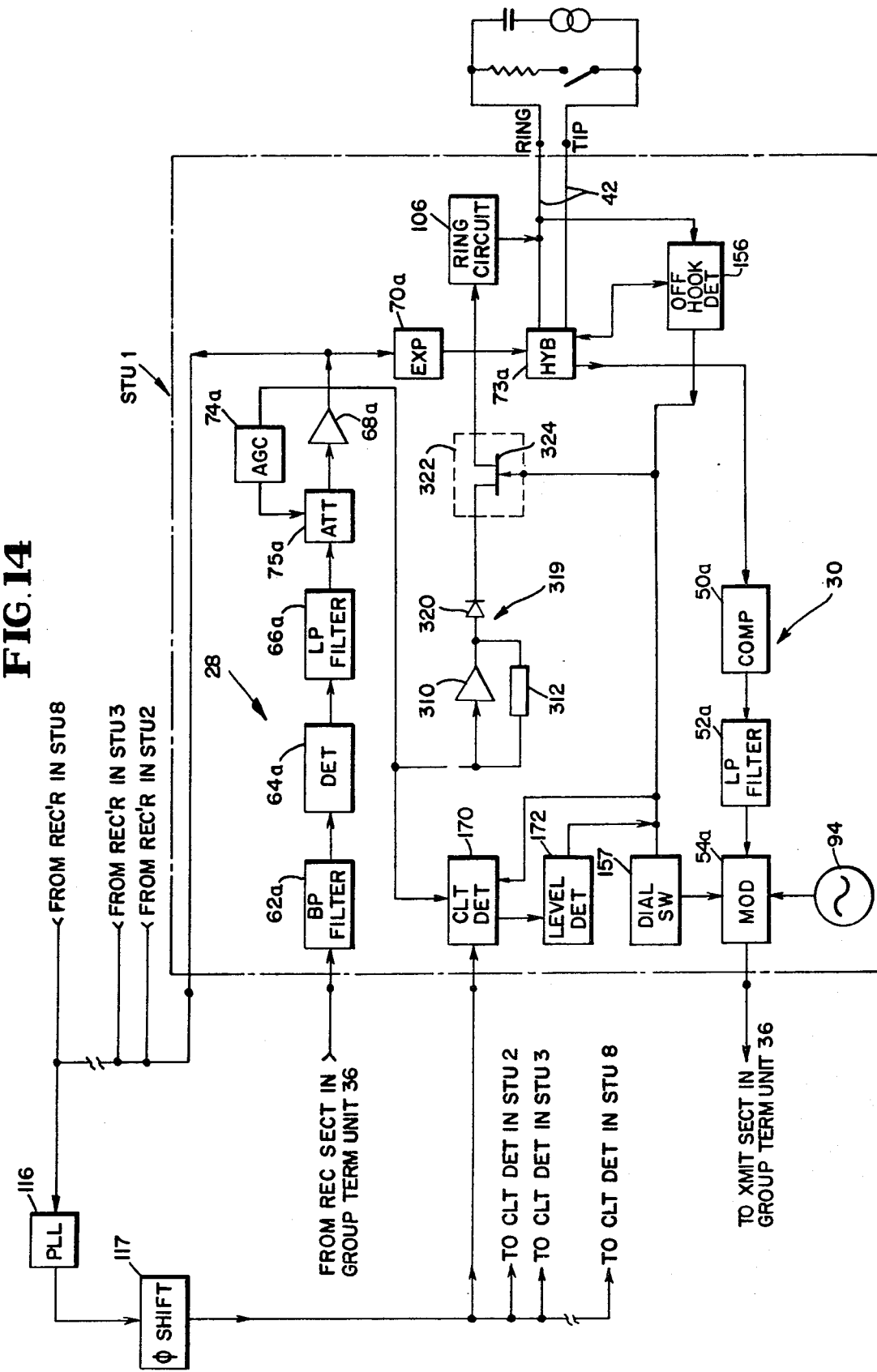
FIG. 14 is a schematic block diagram illustrating yet another embodiment of the signalling circuitry for the subscriber terminal circuit.

The embodiment shown in FIG. 14 is the same as that shown in FIG. 13 except that the synchronous detector 104 is replaced by a envelope detector 319 and a separate ring squelch 322. Detector 319 comprises a diode 320 connected in the signal current path at the output of filter 310 to detect the recovered 900 Hz alerting signal and thereby provide a rectification that is the same as the one indicated at 144 in FIG. 7.

Ring squelch 322 is connected between diode 320 and ring circuit 106 and may comprise a FET 324. As shown the source and drain electrodes of FET 324 are connected in series between diode 320 and the input of ring circuit 106. The output of the off-hook detector 156 is connected to the gate electrode of FET 324.

When the subscriber's telephone is on-hook the voltage applied to the gate of FET 325 will be such to cause the FET 325 to conduct, thus providing for the conduction of the detected or rectified 900 Hz alerting signal 144 to ring circuit 106. When the off-hook detector 156 senses the off-hook condition of the subscriber's telephone it causes the voltage on the gate of FET 324 to go negative sufficiently to turn off FET 324. When this happens the circuit between diode 320 and ring circuit 106 will open, thus squelching the 900 Hz alerting signal and thereby preventing its application to ring circuit 106.

In all three of the embodiments shown in FIGS. 3, 13 and 14 it will be appreciated that the central office ringing frequency information will be transmitted to provide the ringing signal voltage 154 with a frequency which is the same as that of the central office ringing signal 134, whatever the frequency of signal 134 may be.

Figure 15:
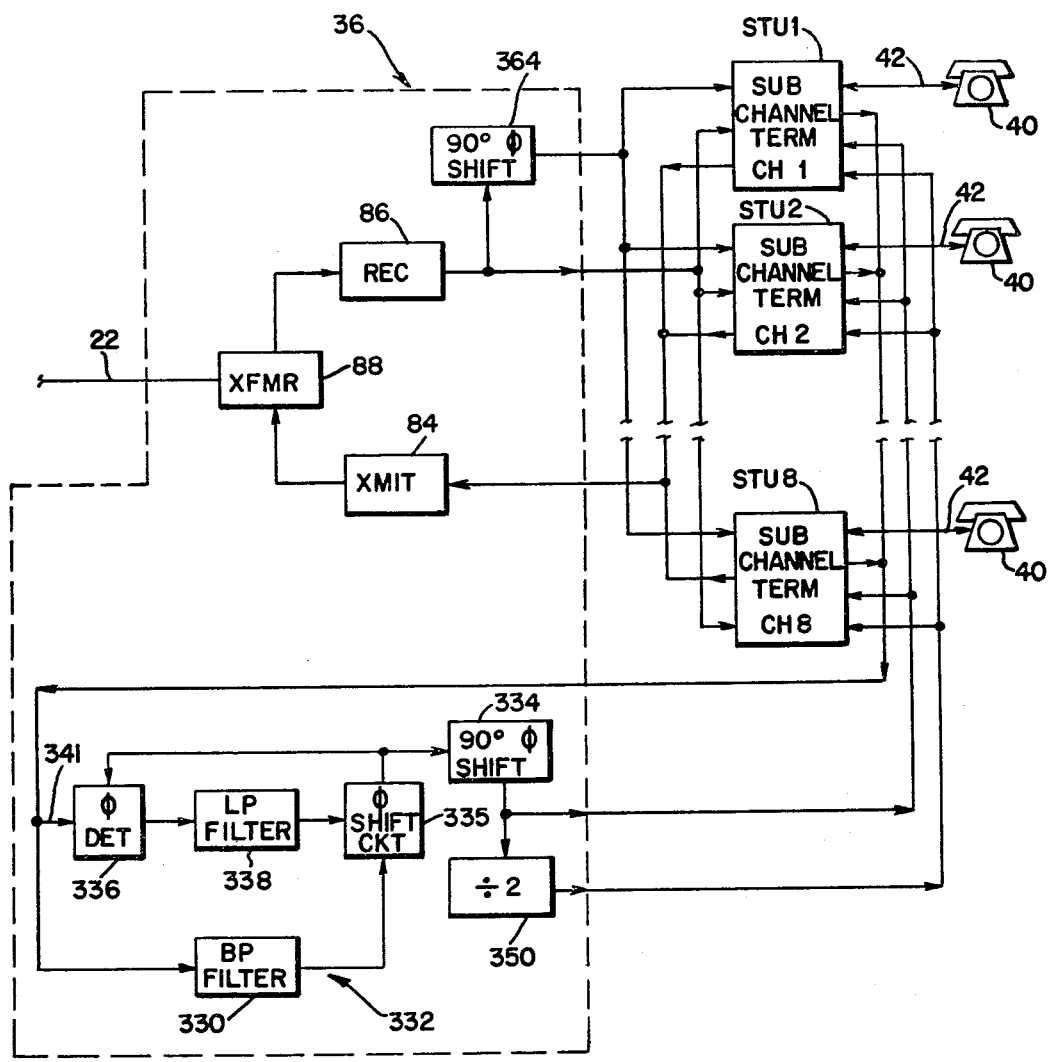
FIG. 15 is a schematic block diagram of yet another embodiment of the subscriber terminal equipment.
Figure 16:
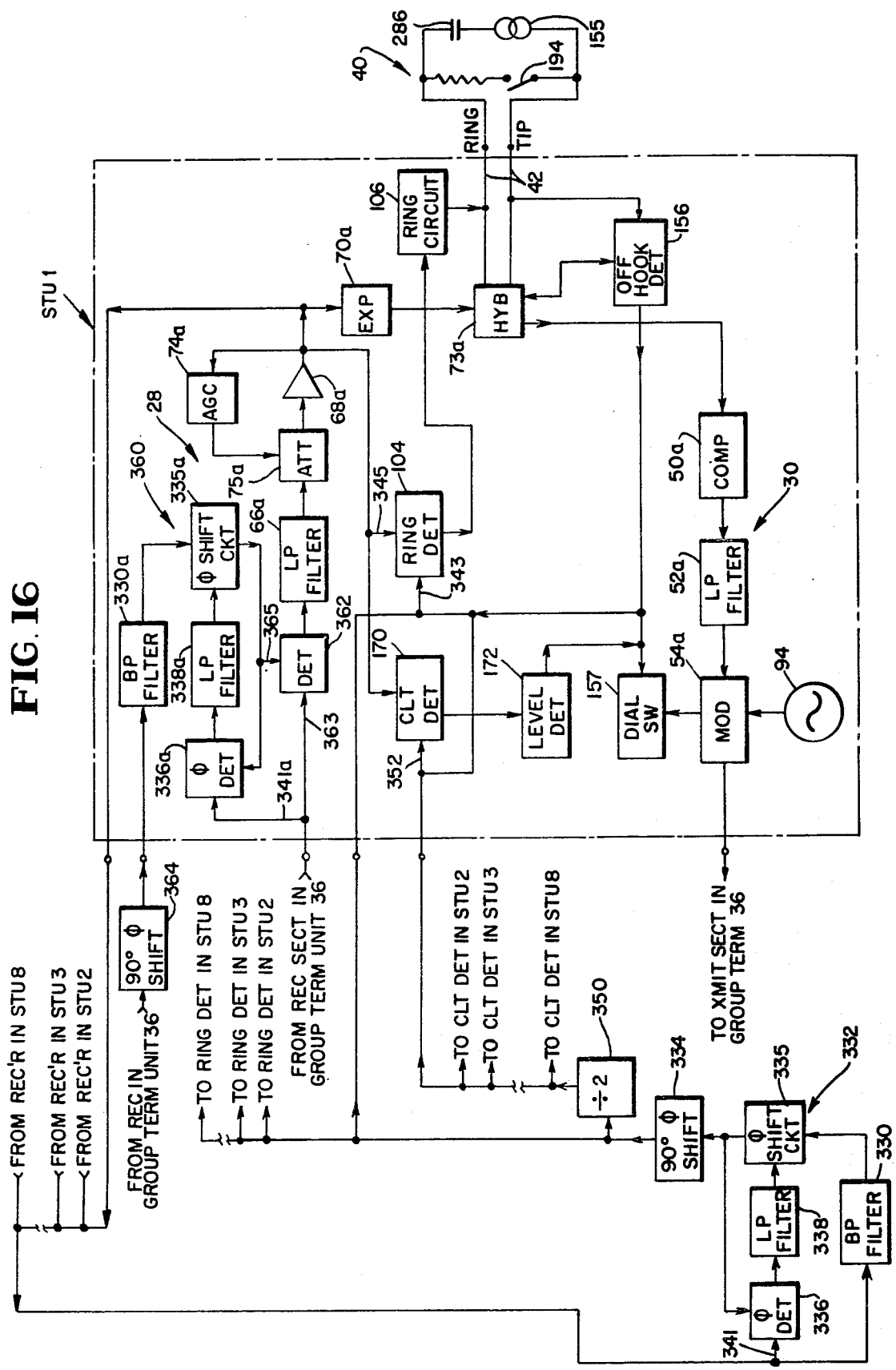
FIG. 16 is a schematic block diagram illustrating details of one of the subscriber terminal circuits shown in FIG. 15.

Like the systems shown in FIGS. 12–14, only one signal, namely the interrupted alerting signal, is used in the embodiment of FIGS. 15 and 16 to alert a subscriber to an incoming call. In the system shown in FIGS. 15 and 16, the phase locked loop and frequency divider 118 are not used to supply the synchronous signal for synchronsouly detecting the transmitted alerting signal as described in the first embodiment of FIGS. 1–8. Instead, the subscriber terminal equipment shown in FIGS. 15 and 16 is equipped with a narrow bandpass filter 330, a special phase-correcting type of phase locked loop 332 and a 90° phase shifter 334 for supplying the synchronous signal. To the extent that the embodiments of FIGS. 1–8 and FIGS. 15 and 16 are alike, like reference characters have been applied to designate like circuits and components.

As shown, filter 330, loop 332 and phase shifter 334 all form a part of the subscriber group terminal equipment which is common to all of the subscriber terminal circuits STU1-STU8. Filter 330 may advantageously be of the active type such as filter 310 and is tuned to the frequency of the alerting signal that is used to signal an incoming call. The alerting signal frequency separated by filter 330 is used to operate the synchronous detectors 104 in the subscriber terminal circuits as will be described in greater detail shortly.

At resonance (i.e., at the alerting signal frequency) the circuit of filter 330 is essentially resistive. However, for off-resonant frequencies filter 330 will either be capacitive or inductive. In situations where the incoming alerting signal is not precisely or closely at the resonant frequency of filter 330, it will therefore undergo a phase shift upon being conducted through the filter 330. The phase-correcting loop 332 is used to automatically correct or adjust for this undesirable phase shift.

Loop 332 differs from an ordinary phase locked loop in that is has no oscillator and instead uses a controllable phase shifting circuit 335 in place of an oscillator. In this regard it will be noted parenthetically that a conventional phase locked loop typically includes a voltage controlled oscillator.

In addition to the controllable phase shifting circuit 335 loop 332 includes a phase detector 336 and a low pass filter 338 which may be of the active type. Phase detector 336 and filter 338 may be the same as or similar to the type of phase detector and low pass filter that are found in the ordinary type of phase locked loop having a voltage controlled oscillator.

The outputs of the AGC amplifier 68a in all of the subscriber terminal circuits STU1-STU8 are OR'D or otherwise combined together to feed the input of filter 330 and also the signal input 341 of phase detector 336. When the alerting signal is received and recovered at any one or more of the subscriber terminal circuits STU1-STU8 it will therefore be fed to filter 330 and input 341 of detector 336. Filter 330 passes the altering signal while rejecting or attenuating to frequency dependent degrees signals of all other frequencies. The output of filter 330 feeds the signal input of the phase shifting circuit 335 as shown.

The output of the controllable phase shifting circuit 335 is fed to phase shifter 334 and from there to the synchronous signal input (indicated at 343 in FIG. 16) of the ring detector 104 in each of the subscriber terminal circuits STU1-STU8. In addition, the signal at the output of the phase shifting circuit 335 is fed back in loop 332 to a further input of the phase detector 336 which is separate from the signal input 341. Phase detector 336 may be a FET (a field effect transistor) and compares the phase of the signal voltage at the output of the phase shifting circuit 335 with the signal voltage at the signal input 341 to develop an error correction voltage. The error correction voltage is a measure of the phase difference between the signal voltage at the output of the phase shifting circuit 335 and the signal voltage at input 341 and hence at the output of the AGC amplifier 68a. The error correction signal at the output of phase detector 336 is applied to filter 338 which filters off undesired frequency components and makes the error correction signal a d.c. voltage. The filtered error correction signal is fed from filter 338 to the control input of the phase shifting circuit 335 to control or vary the delay or phase shift of the incoming alerting signal as a function of the phase difference that is detected or sensed by phase detector 336.

The phase corrected signal voltage at the output of the phase shifting circuit 335 will be 90° out of phase with the signal voltage applied to the signal input 341 of phase detector 336. This phase difference is due to the operation of phase detector 336 and is also encountered in the operation of an ordinary phase locked loop using a voltage controlled oscillator. A 90° phase shift is therefore needed at some point in the system to put the output of the phase shifting circuit 335 into phase with the received alerting signal at the output of the AGC amplifier 68a in any one or more of the subscriber terminal circuits STU1-STU8.

In the illustrated embodiment this is accomplished by locating the 90° phase shifter 334 at the output of the controllable phase shifting circuit 335 to shift the phase corrected signal voltage by the required 90° before applying the phase corrected signal to the synchronous inputs of the ring detectors 104 in the subscriber terminal circuits STU1-STU8. Alternatively, the 90° phase shifter 334, which may be of the LC type, may be connected to phase shift the incoming signal before it is applied to the signal input 341 of phase detector 336.

Phase shifting circuit 335 may be a controllable time delay line in which the signal at the output of circuit 335 is variably delayed with respect to the signal at the input of circuit 335 by a magnitude that is determined by the error correction signal mentioned above.

For example, the phase shifting circuit 335 may be a monostable multivibrator (also called a one-shot multivibrator). The time delay is obtained by using the monostable multivibrator circuit to provide a trigger pulse output at some variable and controllable prescribed time interval after the application of a pulse input to the circuit. The error correction signal voltage mentioned above may be utilized to control or adjust an appropriate resistance in the monostable multivibrator to vary the time delay between the application of a signal pulse at the input of the multivibrator circuit and the trigger pulse at the output of the multivibrator circuit. This variable resistance may take the form of field effect transistor (FET). If a monostable multivibrator is used, than a shaping circuit (not shown) will be connected between the output of filter 330 and the input of circuit 335 to transform the filtered a.c. alerting signal waveform into suitable pulses at the alerting signal frequency for operating the one-shot multivibrator.

The signalling operation of the circuitry thus far described for the embodiment of FIGS. 15 and 16 will now be considered, using the example of the channel 1 subscriber who is served by the channel terminal circuits COT1 and STU1.

When an incoming call arrives at the central office for the subscriber served by the channel terminal circuits COT1 and STU1 the central office relay 130 is operated as previously described to connect the ring generator 132 to the ring terminal 126 in the central office terminal circuit COT1. The central office ringing supplied by ring generator 132 will therefore be applied to switch 100, causing switch 100 to be turned on by the positive alternations of the ringing signal 134 and to be turned off by the ringing signal's negative alternations as previously described.

The alerting signal will therefore be conducted to modulator 54 only during the positive alternations of the central office ringing signal 134. As a result, conduction of the alerting signal will be interrupted periodically at the central office ringing signal rate or frequency during the ringing intervals of the ringing signal 134. The channel 1 carrier signal will therefore be amplitude modulated periodically by the interrupted alerting signal at a rate equal to the frequency of the central office ringing signal 134.

Upon receiving and detecting the called subscriber's modulated carrier signal in terminal circuit STU1, the interrupted alerting signal will be recovered and will be present at the output of the AGC amplifier 68a in terminal circuit STU1. From amplifier 68a the recovered alerting signal will be fed to the bandpass filter 330 and also to the signal input 341 of phase detector 336. Additionally, the recovered altering signal at the output of amplifier 68a will be fed to the signal input (indicated at 345 in FIG. 16) of the synchronous detector 104 in the called subscriber's subscriber terminal circuit STU1.

The alerting signal fed to bandpass filter 330 will be passed by the filter to the controllable phase shifting circuit 335. If the alerting signal at the output of circuit 335 is not 90° out of phase with the alerting signal at the output of the AGC amplifier 68a, phase detector 336 will develop the previously mentioned error correction signal which causes circuit 335 to automatically correct the phase of the alerting signal.

The phase corrected alerting signal at the output of circuit 335 is then phase shifted 90° by phase shifter 334 so that the signal at the output of phase shifter 334 and hence at the synchronous input 343 of ring detector 104 will be synchronized with the alerting signal which is fed directly from the output of amplifier 68a to the signal input 345 of the synchronous ring detector 104. As a result, the phase corrected alerting signal at the synchronous input 343 of ring detector 104 will act as a synchronous signal to cause ring detector 104 to synchronously detect the alerting signal which is fed to the signal input 345. The synchronously detected alerting signal at the output of ring detector 104 is fed to the ring circuit 106 in the called subscriber's subscriber terminal circuit STU1 which operates in the manner previously described to ring the called subscriber's telephone.

It will be appreciated that the alerting signal frequency at the synchronous signal input 343 will be the same as the alerting signal frequency at the signal input 345. In effect the interrupted alerting signal will appear at two places or terminals, one being at input 343 and the other being at the input 345. The alerting signal at input 343 is considered to be synchronized with its counterpart at input 345 if it is either in phase or 180° out of phase with the alerting signal at input 345. In either case it will have the effect of synchronously detecting the alerting signal at input 345.

It will be noted that the waveform of the alerting signal at input 343 does not have to be the same as the waveform of its counterpart at input 345 as long as the zero cross-overs of the two waveforms occur at or approximately at the same time. Thus, the phase-corrected alerting signal fed to input 343 may be a square wave while the alerting signal which is fed to input 345 for detection may be a sine wave. Use of a one-shot multivibrator as the phase-shifting circuit 334 provides a square wave.

The phase locked loop 116 and phase shifter 117 may be used to supply the synchronous signal to the channel loop test detector 170 in each of the subscriber terminal circuits STU1–STU8 as previously described. Alternatively, loop 116 and phase shifter 117 may be replaced by a frequency divider 350 (see FIG. 16) which is connected to the output of the phase shifting circuit to frequency divide the signal at the output of circuit 335 by a suitable interger such as two.

The frequency-divided output of divider 350 is fed to the synchronous input (indicated at 352 in FIG. 6) of the channel loop test detector 170 in each of the subscriber terminal circuits. For this arrangement the 1800 Hz frequency supplied by oscillator 108 may be used as the alerting signal to alert subscribers to incoming calls and the frequency divided signal of 900 Hz may be used for the channel loop test operation. This frequency allocation obviously necessitates an interchange of signal input connections to switches 100 and 102 in the central office terminal circuits COT1–COT8 such that the 1800 Hz signal is fed to swtich 100 and the 900 Hz signal is fed to switch 102.

The particular circuit design of loop 332 may also be used to synchronously detect other signals, such as the carrier signal itself. If it is desired to synchronously detect the carrier signaal in this manner, for example, a special phase locked loop corresponding to loop 332 is added to each of the subscriber terminal circuits in the manner shown in FIG. 16. In FIG. 16 the loop used for synchronously detecting the incoming carrier signal is indicated at 360. In addition to loop 360 the subscriber terminal circuit is equipped with a bandpass filter 330a, and the regular detector 64a is replaced by a synchronous detector 362.

If desired, the channel bandpass filter 62a may be eliminated as illustrated in FIG. 16. Alternatively, it may be replaced by a channel bandpass filter of the type described in my previously identified copending application. In this embodiment the group terminal circuit 36 is advantageously equipped with a 90° phase shifter 364 which is connected in the receive section 86.

Since loop 360 is the same as loop 332 like reference numerals suffixed by the letter a have been applied to designate the corresponding parts of loop 360.

As shown in FIGS. 15 and 16 the composite of the incoming carrier signals is fed to the input of phase shifter 364. Additionally, this composite of the incoming carrier signals is fed to the signal input 363 of the synchronous detector 362 and to the phase detector's signal input 341a in each of the subscriber terminal circuits.

The 90° phase shifter 364 in the group terminal circuit shifts each of the incoming carrier signals by the required 90°. The composite of the phase shifted carrier signals at the output of phase shifter 364 is fed to the input of the bandpass filter 330a in each of the subscriber terminal circuits as shown.

Bandpass filter 330a may be of the active type like filter 330 and is tuned to the particular carrier frequency to be received in its associated subscriber terminal circuit. Thus, the bandpass filter 330a in terminal circuit STU1 will be tuned to the frequency of the carrier signal transmitted by terminal circuit COT1, the bandpass filter 330a in terminal circuit STU2 will be tuned to the frequency of the carrier signal transmitted by terminal circuit COT2, and so on. The output of filter 330a feeds the input of the controllable phase shift circuit 335a, and the output of the controllable phase shifting circuit 335a is connected to and feeds the synchronous input 365 of the synchronous detector 362. Phase shifter 364 performs the same function as phase shifter 334.

From the foregoing description it will be appreciated that bandpass filter 330a will pass only the desired carrier signal and will reject all of the other carrier signals which are transmitted down transmission line 22 from the central office terminal equipment. The carrier signal passed by filter 330a is fed to the controllable phase shifting circuit 335a in loop 360. Circuit 335a will provide the previously described phase correction of the incoming carrier signal such that the phase of the carrier signal at the synchronous input 365 of detector 362 will either be in phase or 180° out of phase with the unshifted carrier signal of the same frequency at input 363. In either case the phase shifted carrier signal at the synchronous input 365 will have the effect of synchronously detecting the unshifted carrier signal of the same frequency at input 363.

When the phase-corrected or phase-adjusted carrier signal at the synchronous input 365 and the desired incoming carrier signal at input 363 are combined in detector 362, the resulting beat or difference frequency will be zero, and the detector output will contain an audio signal reproduction of the transmitted modulation (i.e., the VF signal intelligence which was applied to modulate the carrier at the corresponding central office terminal circuit).

For example, if a 1 kHz tone is applied to modulate the carrier signal that is transmitted from the central office channel terminal circuit COT1, then the modulated carrier signal will domodulate as a 1 kHz signal at the output of the synchronous detector 362 in the subscriber channel terminal circuit STU1. The beat or difference frequency between the applied synchronous signal at input 365 and each of the remaining unwanted carrier signals which may appear at input 363 will be significantly above the 3000 Hz cutoff of the low pass filter 66a. Likewise, the beat or difference frequency between the applied synchronous signal at input 365 and the upper and lower side frequencies of each of these unwanted carrier signals from the other channels will also be significantly above the 3000 Hz cutoff of filter 66a. As a result these undesired frequency components will be filtered off by filter 66a so that only the desired voice frequency intelligence will appear at the output of filter 66a.

From the foregoing description it will be appreciated that each of the controllable phase shifting circuits 335 and 355a merely shifts the phase of the input signal that is fed to its input port and does not change the frequency of the phase-corrected signal. Following phase correction the signal out of each of the phase shifting circuits 335 and 335a will therefore be the same as the input signal frequency.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of conducting a channel loop test on a transmission channel of an amplitude modulated telephone carrier system wherein said channel is defined by first and second transmitting and receiving channel terminal circuits which are interconnected by a transmission line, said first terminal circuit having (a) a communication transmitter for transmitting a first carrier signal of preselected frequency over said line to said second terminal circuit, and (b) a communication receiver tuned to receive a second carrier signal of a preselected frequency that is different from the frequency of said first carrier signal, and said second terminal circuit having (a) a communication receiver tuned to receive said first carrier signal and (b) a communication transmitter operative to transmit said second carrier signal, said method comprising the steps of supplying a channel loop test a.c. signal of preselected frequency, injecting said a.c. signal at a preselected level into the transmitter of said first terminal circuit for amplitude modulating said first carrier signal, receiving and detecting said first carrier signal in the receiver of said second terminal circuit to recover said a.c. signal, providing an additional signal of preselected frequency, utilizing said additional signal to synchronously detect said a.c. signal following its recovery by the detection of said first carrier signal in said second terminal circuit, transmitting said second carrier signal over said line from the transmitter of said second terminal circuit to said first terminal circuit upon synchronously detecting said a.c. signal, conducting the recovered a.c. signal through at least a part of the transmitter in said second terminal circuit to amplitude modulate said second carrier signal, receiving and detecting said second carrier signal in the receiver of said first terminal circuit to recover said a.c. signal from said second carrier signal, and comparing the level of the a.c. signal with a reference value after the a.c. signal is recovered by the detection of said second carrier signal.

2. An amplitude modulated telephone carrier system comprising first terminal means, a first transmitter circuit forming a part of said first terminal means for transmitting a first carrier signal of preselected frequency and having means for amplitude modulating said first carrier signal with voice frequency signals, a first receiver circuit forming a part of said first terminal means, a second terminal means located remotely from said first terminal means, a second receiver circuit forming a part of said second terminal means, a second transmitter circuit forming a part of said second terminal means, a transmission line connected to transmit said first carrier signal to said second receiver circuit, said first terminal means further including means for selectively applying a channel loop test signal of preselected frequency and preselected amplitude to said first carrier signal, said second receiver circuit being tuned to receive said first carrier signal and having means for demodulating said first carrier signal to recover said test signal, said second terminal means further including detecting means for synchronously detecting the channel loop test signal that is recovered from said first carrier signal in said second receiver circuit, means responsive to the detection of the recovered channel loop test signal by said detecting means to turn on said second transmitter circuit, said second transmitter circuit supplying a second carrier signal upon being turned on, and said second carrier signal having a preselected frequency that is different from the frequency of said first carrier signal, said second transmitter circuit having means for amplitude modulating said second carrier signal, circuit means interconnecting said second transmitter circuit and said second receiver circuit to provide a signal path by which the recovered channel loop test signal is conducted from said second receiver circuit to the modulating means in said second transmitter circuit for amplitude modulating said second carrier signal, said transmission line being connected to transmit said second carrier signal to said first receiver circuit, and said first receiver circuit being tuned to receive said second carrier signal and having means for demodulating said second carrier signal to recover the channel loop test signal from said second carrier signal, and there being means for comparing the level of said channel loop test signal with a reference value following the recovery of said channel loop test signal from said second carrier signal, said detecting means for detecting said channel loop test signal in said second receiver circuit comprising a synchronous detector, and means for supplying an additional signal to said synchronous detector to provide for the synchronous detection of said channel loop test signal following its recovery from said first carrier signal.

3. An amplitude modulated telephone carrier system comprising a first station located at a central office, a second station located remotely from said central office, a transmission line providing a signal transmission link between said first and second stations, at least first and second transmitter-receiver units, said first unit being located at said first station, and said second unit being located at said second station and being adapted to be connected to a subscriber's telephone, means electrically connecting said first unit to said transmission line, means electrically connecting said second unit to said transmission line, a first transmitter forming a part of said first unit for amplitude modulating a first carrier frequency signal with voice frequency information signals, means located at said first station for selectively applying an alternating signal at a pre-selected level to said first transmitter to amplitude modulate said first carrier signal, said first transmitter providing for the transmission of said first carrier signal over said transmission line to said second unit, a first receiver forming a part of said second unit for receiving and demodulating said first carrier signal to recover said voice frequency signals and also said alternating signal when the latter is applied to modulate said first carrier signal, a second transmitter forming a part of said second unit, control means in said second unit for turning said second transmitter on in response to the off-hook state of said telephone and further for turning said second transmitter off in response to the on-hook state of said telephone, said second transmitter being effective to transmit a second carrier frequency signal over said transmission line to said first unit upon being turned on and further to stop the transmission of said second carrier signal upon being turned off, means forming a part of said second transmitter for amplitude modulating said second carrier signal with voice frequency signals from said telephone, means in said second unit for detecting the alternating signal recovered by said first receiver, signal level sensing means forming a part of said second unit and electrically connected to alternating signal detecting means and to said control means, said level sensing means being responsive to a signal level which the recovered alternating signal will have when it is applied at pre-selected level to modulate said first carrier signal to cause said control means to turn said second transmitter on, means interconnecting said first receiver and said second transmitter for feeding the recovered alternating signal to said second transmitter for modulating said second carrier signal while said telephone is in its on-hook state for effecting a channel loop test, and a second receiver forming a part of said first unit for receiving and demodulating said second carrier signal to recover the modulating signals from said second carrier signal, including said alternating signal to enable the conditions of said transmitters and receivers to be checked from the level of the recovered alternating signal.

4. The amplitude modulated station carrier system defined in claim 3 including means located at said first station and responsive to an incoming call for said telephone for applying said alternating signal to said first transmitter to modulate said first carrier signal for transmission to said second unit and for providing the alternating signal which is applied to said first transmitter in response to the incoming call with a further level which is different from said pre-selected level and which is also pre-selected, means at said second station for utilizing said alternating signal and a further signal for ringing said telephone, and said level sensing means being non-responsive to said alternating signal when it is transmitted at said further level such that the transmission of said alternating signal at said further level does not have the effect of turning on said second transmitter.

* * * * *